(12) United States Patent
Murata et al.

(10) Patent No.: US 10,144,297 B2
(45) Date of Patent: Dec. 4, 2018

(54) ELECTRICAL STORAGE SYSTEM

(71) Applicant: TOYOTA JIDOSHA KABUSHIKI KAISHA, Toyota-shi, Aichi-ken (JP)

(72) Inventors: Takashi Murata, Kasugai (JP); Yasumitsu Omi, Okazaki (JP); Takashi Yamanaka, Kariya (JP); Masayuki Takeuchi, Aichi-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 223 days.

(21) Appl. No.: 14/914,876

(22) PCT Filed: Aug. 26, 2014

(86) PCT No.: PCT/IB2014/001616
§ 371 (c)(1),
(2) Date: Feb. 26, 2016

(87) PCT Pub. No.: WO2015/028865
PCT Pub. Date: Mar. 5, 2015

(65) Prior Publication Data
US 2016/0214495 A1    Jul. 28, 2016

(30) Foreign Application Priority Data

Aug. 26, 2013    (JP) .................................. 2013-174550

(51) Int. Cl.
 *B60L 11/18*    (2006.01)
(52) U.S. Cl.
 CPC ......... *B60L 11/1816* (2013.01); *B60L 11/184* (2013.01); *B60L 11/187* (2013.01);
(Continued)

(58) Field of Classification Search
CPC .................................................. B60L 11/1816
(Continued)

(56) References Cited

U.S. PATENT DOCUMENTS

2009/0021221 A1\* 1/2009 Krauer ................ B60L 11/1875
320/153
2009/0243538 A1 10/2009 Kelty et al.

FOREIGN PATENT DOCUMENTS

JP    2011-182585 A    9/2011
JP    2011-259672 A    12/2011
(Continued)

*Primary Examiner* — Joseph Chang
(74) *Attorney, Agent, or Firm* — Hunton Andrews Kurth LLP

(57) ABSTRACT

Charging of an electrical storage device is completed by operation-starting time while increasing a percentage of a charging time of the electrical storage device in a first time period as compared to a percentage of the charging time in a second time period when the first time period and the second time period are included within a period from when a user sets the operation-starting time to the operation-starting time. A temperature adjustment device is operated such that a temperature of the electrical storage device at the operation-starting time falls within a target temperature range while increasing a percentage of an operating time of the temperature adjustment device in the first time period as compared to a percentage of the operating time in the second time period when the first time period and the second time period are included within the period from when the user sets the operation-starting time to the operation-starting time. The operation-starting time is scheduled time at which a start-up of a vehicle is initiated.

6 Claims, 16 Drawing Sheets

(52) U.S. Cl.
CPC ....... *B60L 11/1874* (2013.01); *B60L 11/1875* (2013.01); *B60L 2240/545* (2013.01); *B60L 2240/80* (2013.01); *B60L 2250/14* (2013.01); *B60L 2260/56* (2013.01); *B60L 2260/58* (2013.01); *Y02T 10/7005* (2013.01); *Y02T 10/705* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
USPC ....................................................... 307/10.1
See application file for complete search history.

(56) References Cited

FOREIGN PATENT DOCUMENTS

| | | |
|---|---|---|
| JP | 2012044813 A | 3/2012 |
| JP | 2012075282 A | 4/2012 |

\* cited by examiner

ELECTRICAL STORAGE SYSTEM

BACKGROUND OF THE INVENTION

1. Field of the Invention

The invention relates to an electrical storage system that charges an electrical storage device with electric power from a commercial power supply and that adjusts the temperature of the electrical storage device.

2. Description of Related Art

In Japanese Patent Application Publication No. 2011-259672 (JP 2011-259672 A), an electrical storage device is charged from an external power supply, a user is allowed to set time at which the charging is completed (referred to as charging completion time). When the charging completion time is set, the electrical storage device is charged such that charging of the electrical storage device completes at the charging completion time. In JP 2011-259672 A, in order to bring the temperature of the electrical storage device at the charging completion time into a predetermined temperature range, a fan for cooling the electrical storage device is operated until the charging completion time when the temperature of the electrical storage device is high.

In a vehicle on which the electrical storage device is mounted, a user is allowed to set time at which a start-up of the vehicle is initiated (referred to as operation-starting time). In JP 2011-259672 A, when the operation-starting time is set, the charging completion time is set for the operation-starting time. In order to bring the temperature of the electrical storage device at the operation-starting time into the predetermined temperature range, when the temperature of the electrical storage device is high, the fan for cooling the electrical storage device is operated until the operation-starting time.

Usually, a commercial power supply is used as an external power supply, the cost of electricity of the commercial power supply can depend on a time period of a day. The charging completion time (or the operation-starting time) is arbitrarily set by a user, so there may be time periods of different costs of electricity within a period from the time at which charging is initiated to the charging completion time (or the operation-starting time). In such a case, as described in JP 2011-259672 A, if the electrical storage device is charged such that the charging of the electrical storage device completes at the charging completion time (or the operation-starting time), the electrical storage device can be charged more intensively in a time period during which the cost of electricity is high than in a time period during which the cost of electricity is low. Such charging of the electrical storage device burdens the user with an excessive cost of electricity.

On the other hand, when the fan is operated as in the case of JP 2011-259672 A, electric power from the external power supply (commercial power supply) is allowed to be used. As described in JP 2011-259672 A, in the case where the fan is operated such that the temperature of the electrical storage device falls within the predetermined temperature range at the charging completion time (or the operation-starting time), if there are time periods of different costs of electricity within a period up to the charging completion time (or the operation-starting time), the fan can be operated intensively in a time period during which the cost of electricity is high. Such operation of the fan results in burdening the user with an excessive cost of electricity.

SUMMARY OF THE INVENTION

An aspect of the invention provides an electrical storage system. The electrical storage system includes: an electrical storage device mounted on a vehicle and configured to be charged with electric power supplied from a commercial power supply; a temperature adjustment device configured to adjust a temperature of the electrical storage device upon reception of electric power supplied from the commercial power supply; and a controller configured to control charging of the electrical storage device and operation of the temperature adjustment device. The commercial power supply is set such that a cost of electricity of a first time period is lower than a cost of electricity of a second time period.

The controller is configured to complete charging of the electrical storage device by operation-starting time while increasing a percentage of a charging time of the electrical storage device in the first time period as compared to a percentage of the charging time in the second time period when the first time period and the second time period are included within a period from when a user sets the operation-starting time to the operation-starting time. The operation-starting time is scheduled time at which a start-up of the vehicle is initiated. By increasing the percentage of the charging time of the electrical storage device in the first time period as compared to the percentage of the charging time in the second time period, it is possible to charge the electrical storage device by actively utilizing the first time period of which the cost of electricity is low. Thus, even when the user arbitrarily sets the operation-starting time, it is possible to reduce a cost of electricity required to charge the electrical storage device.

The controller is configured to operate the temperature adjustment device such that a temperature of the electrical storage device at the operation-starting time falls within a target temperature range while increasing a percentage of an operating time of the temperature adjustment device in the first time period as compared to a percentage of the operating time in the second time period when the first time period and the second time period are included within the period from when the user sets the operation-starting time to the operation-starting time.

By increasing the percentage of the operating time of the temperature adjustment device in the first time period as compared to the percentage of the operating time in the second time period, it is possible to operate the temperature adjustment device by actively utilizing the first time period of which the cost of electricity is low. Thus, even when the user arbitrarily sets the operation-starting time, it is possible to reduce a cost of electricity required to operate the temperature adjustment device.

By bringing the temperature of the electrical storage device at the operation-starting time into the target temperature range through the operation of the temperature adjustment device, it becomes easy to ensure the input/output performance of the electrical storage device at the operation-starting time. Because the input/output performance of the electrical storage device depends on the temperature of the electrical storage device, it is possible to initiate a start-up of the vehicle in a state where the input/output performance of the electrical storage device is ensured by bringing the temperature of the electrical storage device into the target temperature range.

When the operation of the temperature adjustment device is completed earlier than the operation-starting time, a temperature variation in the electrical storage device within the period from when the operation of the temperature adjustment device is completed to the operation-starting time may be estimated from a temperature of a surrounding environment of the electrical storage device. When the operation of the temperature adjustment device is completed, the temperature of the electrical storage device is influenced by the temperature of the surrounding environment of the electrical storage device. Therefore, it is possible to acquire the temperature variation in the electrical storage device on the basis of the temperature of the surrounding environment.

The temperature variation in the electrical storage device indicates a value obtained by subtracting the temperature of the electrical storage device at the time when the operation of the temperature adjustment device is completed from the temperature of the electrical storage device at the operation-starting time. When the estimated temperature variation is a negative value, it appears that the temperature of the electrical storage device decreases after the operation of the temperature adjustment device is completed. Therefore, the temperature of the electrical storage device may be increased in advance in consideration of the temperature variation (the amount of decrease in temperature) by the time when the operation of the temperature adjustment device is completed, and it is possible to bring the temperature of the electrical storage device at the operation-starting time into the target temperature range. Specifically, the temperature of the electrical storage device at the time when the operation of the temperature adjustment device is completed may be increased as compared to an upper limit value of the target temperature range by the temperature variation.

When the temperature of the electrical storage device at the time when the temperature of the electrical storage device has been increased by the temperature variation becomes higher than an upper limit temperature that is allowed by the electrical storage device (allowable upper limit temperature), the temperature of the electrical storage device may be increased to the allowable upper limit temperature. In other words, the temperature of the electrical storage device may not be increased to a temperature higher than the allowable upper limit temperature. Thus, it is possible to suppress generation of abnormal heat in the electrical storage device by suppressing an increase in the temperature of the electrical storage device above the allowable upper limit temperature when the temperature adjustment device is being operated.

When the estimated temperature variation is a positive value, it appears that the temperature of the electrical storage device increases after the operation of the temperature adjustment device is completed. Therefore, the temperature of the electrical storage device may be reduced in advance in consideration of the temperature variation (the amount of increase in temperature) by the time when the operation of the temperature adjustment device is completed, and it is possible to bring the temperature of the electrical storage device at the operation-starting time into the target temperature range. Specifically, the temperature of the electrical storage device at the time when the operation of the temperature adjustment device is completed may be reduced as compared to a lower limit value of the target temperature range by the temperature variation.

When the operation-starting time is later than the termination time of the first time period, it becomes easy to reduce a cost of electricity required to operate the temperature adjustment device by sufficiently utilizing the first time period as a time during which the temperature adjustment device is operated. For example, it is possible to operate the temperature adjustment device until the termination time of the first time period. When the operation of the temperature adjustment device is completed by the termination time of the first time period, the temperature variation in the electrical storage device within the period from when the operation of the temperature adjustment device is completed to the operation-starting time may be estimated, and then the temperature adjustment device may be operated such that the temperature of the electrical storage device at the operation-starting time falls within the target temperature range, as described above.

Electric power from the commercial power supply is used when the electrical storage device is charged or when the temperature adjustment device is operated. Therefore, the temperature adjustment device may be operated while the electrical storage device is charged. By operating the temperature adjustment device while charging the electrical storage device, it becomes easy to bring the temperature of the electrical storage device at the operation-starting time into the target temperature range. Particularly, when charging of the electrical storage device completes before the operation-starting time, it is possible to bring the temperature of the electrical storage device close to the target temperature range by the time when the charging of the electrical storage device completes by operating the temperature adjustment device while charging the electrical storage device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described.

Figure 1:
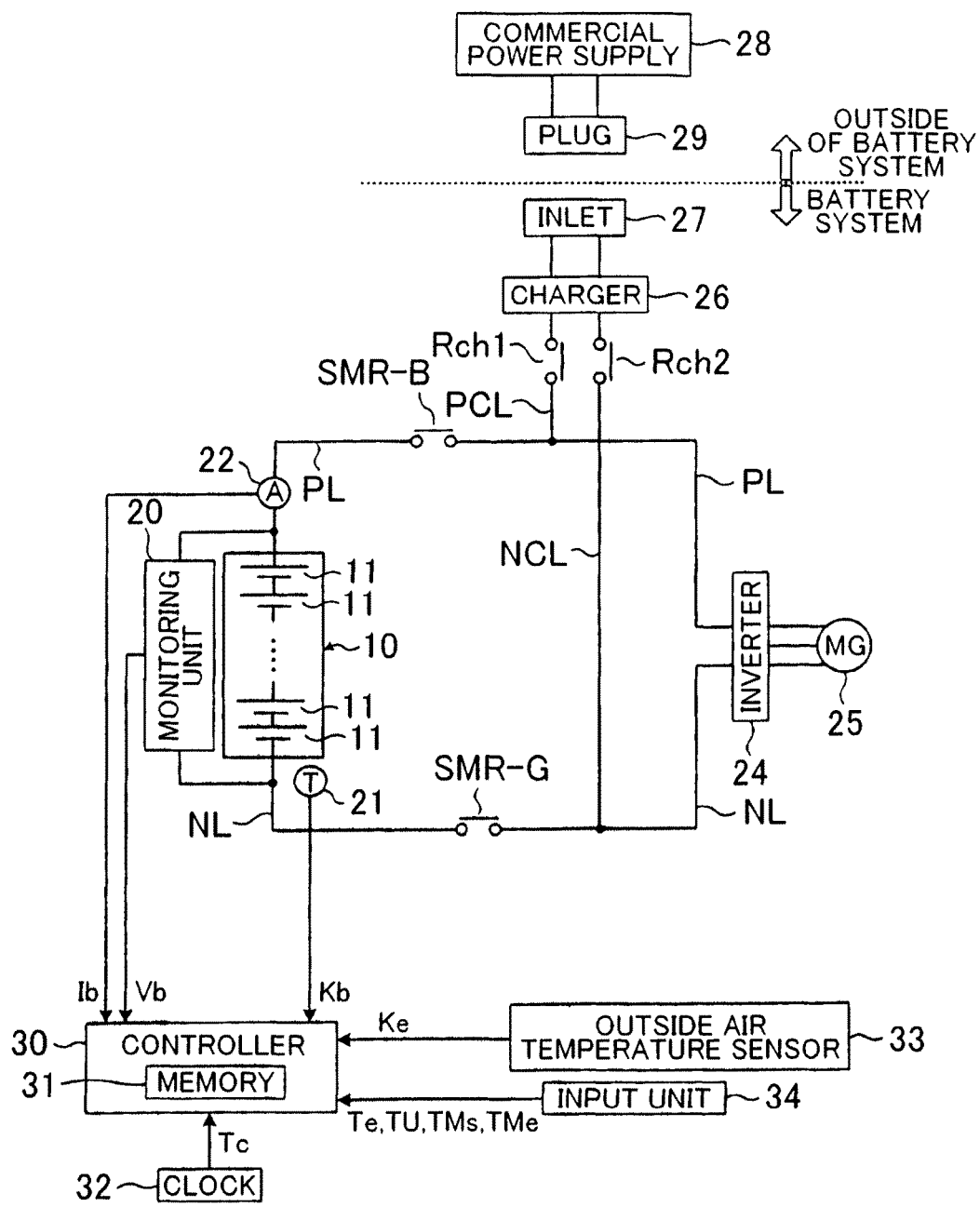
FIG. 1 is a view that shows the configuration of a battery system.

FIG. 1 is a view that shows the configuration of a battery system (which corresponds to the electrical storage system according to the invention) according to the present embodiment. The battery system shown in FIG. 1 is mounted on a vehicle. The vehicle is, for example, a plug-in hybrid vehicle (PHV) or an electric vehicle (EV).

The PHV includes not only a battery pack (described later) as a power source for propelling the vehicle but also another power source, such as an engine and a fuel cell. The EV includes only the battery pack (described later) as a power source for propelling the vehicle. In the PHV and the EV, as will be described later, the battery pack is allowed to be charged with electric power from a commercial power supply.

The battery pack 10 includes a plurality of serially connected single cells 11. An alkaline secondary battery, such as a nickel-metal hydride battery and a nickel-cadmium battery, may be used as each single cell 11. The battery pack 10 functions as an electrical storage device. Instead of the secondary battery, an electric double layer capacitor may be used. The number of the single cells 11 may be set as needed on the basis of a required output, or the like, of the battery pack 10. In the battery pack 10 according to the present embodiment, all the single cells 11 are electrically connected in series with each other; instead, the battery pack 10 may include a plurality of the single cells 11 that are electrically connected in parallel with each other.

A monitoring unit 20 detects the voltage value Vb of the battery pack 10 or detects the voltage value Vb of each single cell 11, and outputs the detected result to a controller 30. A temperature sensor 21 detects the temperature Kb of the battery pack 10 (single cells 11), and outputs the detected result to the controller 30. One or a plurality of the temperature sensors 21 may be arranged for the battery pack 10. When there are variations in temperature among the plurality of single cells 11 depending on the locations at which the single cells 11 are arranged, it is possible to acquire variations in temperature by using the plurality of temperature sensors 21.

A current sensor 22 detects the current value Ib of the battery pack 10, and outputs the detected result to the controller 30. In the present embodiment, the current sensor 22 is provided in a positive electrode line PL connected to the positive electrode terminal of the battery pack 10. The current sensor 22 just needs to be able to detect the current value Ib of the battery pack 10. The location at which the current sensor 22 is provided may be set as needed. For example, the current sensor 22 may be provided in a negative electrode line NL connected to the negative electrode terminal of the battery pack 10. A plurality of the current sensors 22 may be used.

The controller 30 includes a memory 31. The memory 31 stores various pieces of information, which are used by the controller 30 to execute a predetermined process (particularly, a process described in the present embodiment). In the present embodiment, the memory 31 is incorporated in the controller 30; instead, the memory 31 may be provided outside the controller 30. A clock 32 outputs information about current time Tc to the controller 30. The clock 32 may be, for example, an atomic clock. The atomic clock has the function of automatically correcting an error of time by receiving a standard wave.

An outside air temperature sensor 33 detects the temperature (referred to as outside air temperature) Ke of a surrounding environment of the battery pack 10, and outputs the detected result to the controller 30. The outside air temperature Ke is not the temperature Kb of the battery pack 10 but the temperature of a surrounding environment that thermally influences the battery pack 10. For example, the outside air temperature Ke may be the temperature of a space (surrounding environment) in which the battery pack 10 is mounted or may be a temperature in the outside (surrounding environment) of the vehicle.

An input unit 34 is used by a user to input specific information. Information input from the input unit 34 is output to the controller 30. Information input from the input unit 34 may be stored in the memory 31. The input information may be, for example, time Te at which external charging is completed (referred to as charging completion time), time TU at which a start-up of the vehicle is initiated (referred to as operation-starting time), initial time TMs from which a midnight cost of electricity (described later) is applied (referred to as midnight rate initial time) or termination time TMe until which the midnight cost of electricity is applied (referred to as midnight rate termination time) TMe. As will be described later, external charging is to charge the battery pack 10 with electric power from the commercial power supply. The user is allowed to set the charging completion time Te by operating the input unit 34. When the charging completion time Te is set, the battery system shown in FIG. 1 is able to complete external charging by the charging completion time Te.

The operation-starting time TU is time at which the user will initiate a start-up of the vehicle in the future. The operation-starting time TU is allowed to be set by user's operation of the input unit 34. The operation-starting time TU is time at or after the charging completion time Te. In the present embodiment, the input unit 34 is mounted on the vehicle; however, the input unit 34 is not limited to this arrangement. For example, the charging completion time Te and/or the operation-starting time TU may be set by user's operation of a mobile terminal via wireless communication. In this case, the vehicle just needs to include a receiving unit that receives transmission information (information for setting the charging completion time Te and/or the operation-starting time TU) from the mobile terminal. Specifically, instead of the input unit 34 or in addition to the input unit 34, the receiving unit may be provided.

The cost of electricity of the commercial power supply depends on a time period of a day. In the present embodiment, the cost of electricity of a midnight time period (midnight cost of electricity) is lower than the cost of electricity of a time period other than the midnight time period. The midnight time period is regarded as a first time period. The time period other than the midnight time period is regarded as a second time period. The midnight time period is usually set by the business operator of the commercial power supply. The user is allowed to set the midnight rate initial time TMs and/or the midnight rate termination time TMe by operating the input unit 34.

In the present embodiment, in prospect of a situation that the midnight rate initial time TMs and/or the midnight rate termination time TMe are changed, the midnight rate initial time TMs and/or the midnight rate termination time TMe are configured to be input through the input unit 34. When the midnight rate initial time TMs and/or the midnight rate termination time TMe are not changed, information about the midnight rate initial time TMs and/or the midnight rate termination time TMe may be stored in the memory 31 in advance. On the other hand, it is possible to set the midnight rate initial time TMs and/or the midnight rate termination time TMe by operating a mobile terminal without using the input unit 34. In this case, a receiving unit that receives transmission information (information for setting the midnight rate initial time TMs and/or the midnight rate termination time TMe) from the mobile terminal just needs to be provided in the vehicle. The receiving unit may be provided in the vehicle in addition to the input unit 34 or instead of the input unit 34.

A system main relay SMR-B is provided in the positive electrode line PL. The system main relay SMR-B switches between an on state and an off state upon reception of a control signal from the controller 30. A system main relay SMR-G is provided in the negative electrode line NL. The system main relay SMR-G switches between an on state and an off state upon reception of a control signal from the controller 30.

When the battery pack 10 is connected to an inverter 24, the controller 30 switches the system main relays SMR-B, SMR-G from the off state to the on state. Thus, the battery system shown in FIG. 1 enters an activated state (ready-on state). Information about the on/off state of an ignition switch of the vehicle is input to the controller 30. The controller 30 starts up the battery system shown in FIG. 1 in response to the switching of the ignition switch from the off state to the on state.

On the other hand, when connection of the battery pack 10 with the inverter 24 is interrupted, the controller 30 switches the system main relays SMR-B, SMR-G from the on state to the off state. Thus, the battery system shown in FIG. 1 enters a stopped state (ready-off state). When the ignition switch is switched from the on state to the off state, the controller 30 causes the battery system to enter the stopped state.

The inverter 24 converts direct-current power, output from the battery pack 10, to alternating-current power, and outputs the alternating-current power to a motor generator (MG) 25. The motor generator 25 generates kinetic energy for propelling the vehicle upon reception of the alternating-current power output from the inverter 24. The kinetic energy generated by the motor generator 25 is transmitted to wheels, thus causing the vehicle to travel.

When the vehicle is decelerated or the vehicle is stopped, the motor generator 25 converts kinetic energy, generated during braking of the vehicle, to electric energy (alternating-current power). The inverter 24 converts alternating-current power, generated by the motor generator 25, to direct-current power, and outputs the direct-current power to the battery pack 10. Thus, the battery pack 10 stores regenerative electric power.

In the present embodiment, the battery pack 10 is connected to the inverter 24; however, the battery pack 10 is not limited to this configuration. Specifically, a step-up circuit may be provided in a current path between the battery pack 10 and the inverter 24. The step-up circuit is able to step up the output voltage of the battery pack 10 and then to output the stepped-up electric power to the inverter 24. The step-up circuit is able to step down the output voltage of the inverter 24 and then to output the stepped-down electric power to the battery pack 10.

A charger 26 is connected to the positive electrode line PL and the negative electrode line NL via charging lines PCL, NCL. Specifically, the charging line PCL is connected to the positive electrode line PL between the system main relay SMR-B and the inverter 24. The charging line NCL is connected to the negative electrode line NL between the system main relay SMR-G and the inverter 24. The location at which the charging line PCL is connected to the positive electrode line PL and the location at which the charging line NCL is connected to the negative electrode line NL may be set as needed.

Charging relays Rch1, Rch2 are respectively provided in the charging lines PCL, NCL. The charging relays Rch1, Rch2 switch between an on state and an off state upon reception of a control signal from the controller 30. An inlet (connector) 27 is connected to the charger 26.

A plug (so-called connector) 29 connected to the commercial power supply 28 is connected to the inlet 27. By connecting the plug 29 to the inlet 27, it is possible to supply electric power, supplied from the commercial power supply 28, to the battery pack 10 via the charger 26. Thus, it is possible to charge (externally charge) the battery pack 10 from the commercial power supply 28. The charger 26 converts alternating-current power, supplied from the commercial power supply 28, to direct-current power, and outputs the direct-current power to the battery pack 10. The controller 30 is able to control the operation of the charger 26.

The battery system according to the present embodiment is able to carry out external charging when the system main relays SMR-B, SMR-G are in the on state and the charging relays Rch1, Rch2 are in the on state. When external charging is carried out, it is possible to supply a constant current to the battery pack 10, and it is possible to charge the battery pack 10 at a constant current.

A system of supplying electric power from the commercial power supply 28 to the battery pack 10 is not limited to the configuration shown in FIG. 1. In the present embodiment, the charger 26 is mounted on the vehicle; instead, a charger (referred to as external charger) may be installed outside the vehicle. In this case, the charger 26 shown in FIG. 1 is omitted. By connecting the plug 29, connected to the external charger, to the inlet 27, it is possible to supply the battery pack 10 with electric power from the commercial power supply 28.

In the present embodiment, external charging is carried out by connecting the plug 29 to the inlet 27; however, external charging is not limited to this configuration. Specifically, it is possible to supply electric power from the commercial power supply 28 to the battery pack 10 by employing a so-called contactless charging system. In the contactless charging system, it is possible to supply electric power by utilizing electromagnetic induction or a resonance phenomenon without any intervening cable. A known configuration may be employed as the contactless charging system as needed.

Figure 2:
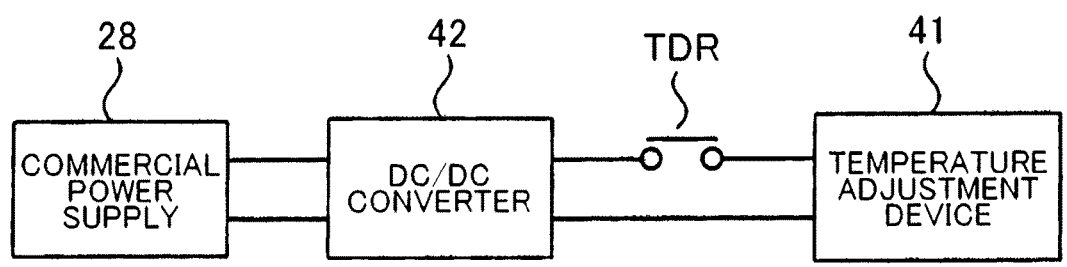
FIG. 2 is a view that shows the configuration of a circuit for operating a temperature adjustment device.

A system that adjusts the temperature of the battery pack 10 will be described with reference to FIG. 2.

A temperature adjustment device 41 is used to adjust the temperature of the battery pack 10. The temperature adjustment device 41 is connected to a DC/DC converter 42 via a relay TDR. The DC/DC converter 42 is connected to the commercial power supply 28. When the relay TDR is in an on state, the DC/DC converter 42 supplies the temperature adjustment device 41 with electric power from the commercial power supply 28. Thus, it is possible to operate the temperature adjustment device 41. The relay TDR switches between an on state and an off state upon reception of a control signal from the controller 30.

When the DC/DC converter 42 is connected to the commercial power supply 28, the charging lines PCL, NCL shown in FIG. 1 are allowed to be used or the positive electrode line PL and the negative electrode line NL are allowed to be used. That is, the DC/DC converter 42 just needs to be connected to a path through which electric power is supplied from the commercial power supply 28 to the battery pack 10. Thus, it is possible to supply electric power, supplied from the commercial power supply 28, to not only the battery pack 10 but also the temperature adjustment device 41.

In order to adjust the temperature of the battery pack 10, the battery pack 10 just needs to be cooled or the battery pack 10 just needs to be heated. When the battery pack 10 is cooled, for example, a Peltier element or a compressor heat pump may be used as the temperature adjustment device 41. The Peltier element generates heat or absorbs heat in response to a direction of flow of current and a current value.

When the battery pack 10 is cooled by supplying the battery pack 10 with a cooling heat exchanging medium (air, liquid, or the like), it is possible to cool the heat exchanging medium, which is supplied to the battery pack 10, by absorbing heat with the use of the Peltier element. The compressor heat pump is able to cool a heat exchanging medium, which is supplied to the battery pack 10, by drawing heat from the heat exchanging medium. The heat of the heat exchanging medium is drawn by reducing the temperature of a heat medium through decompression of the heat medium. When the cooled heat exchanging medium is supplied to the battery pack 10, it is possible to reduce the temperature Kb of the battery pack 10.

When the battery pack 10 is heated, for example, a heater, a Peltier element or a compressor heat pump may be used as the temperature adjustment device 41. When current is supplied to the heater, it is possible to generate heat from the heater. It is possible to heat a heat exchanging medium (air, liquid, or the like), which is supplied to the battery pack 10, with the heat generated from the heater. When current in a predetermined direction is passed through the Peltier element, it is possible to generate heat from the Peltier element. It is possible to heat the heat exchanging medium, which is supplied to the battery pack 10, with the heat generated from the Peltier element. The compressor heat pump is able to heat the heat exchanging medium, which is supplied to the battery pack 10, by increasing the temperature of a heat medium through compression of the heat medium. When the heated heat exchanging medium is supplied to the battery pack 10, it is possible to increase the temperature Kb of the battery pack 10.

In the above description, the heat exchanging medium that is supplied to the battery pack 10 is cooled or heated by the temperature adjustment device 41; however, the configuration of cooling or heating the battery pack 10 is not limited to this configuration. Specifically, the battery pack 10 may be cooled or heated by directly or indirectly bringing the temperature adjustment device 41 into contact with the battery pack 10.

Figure 3:
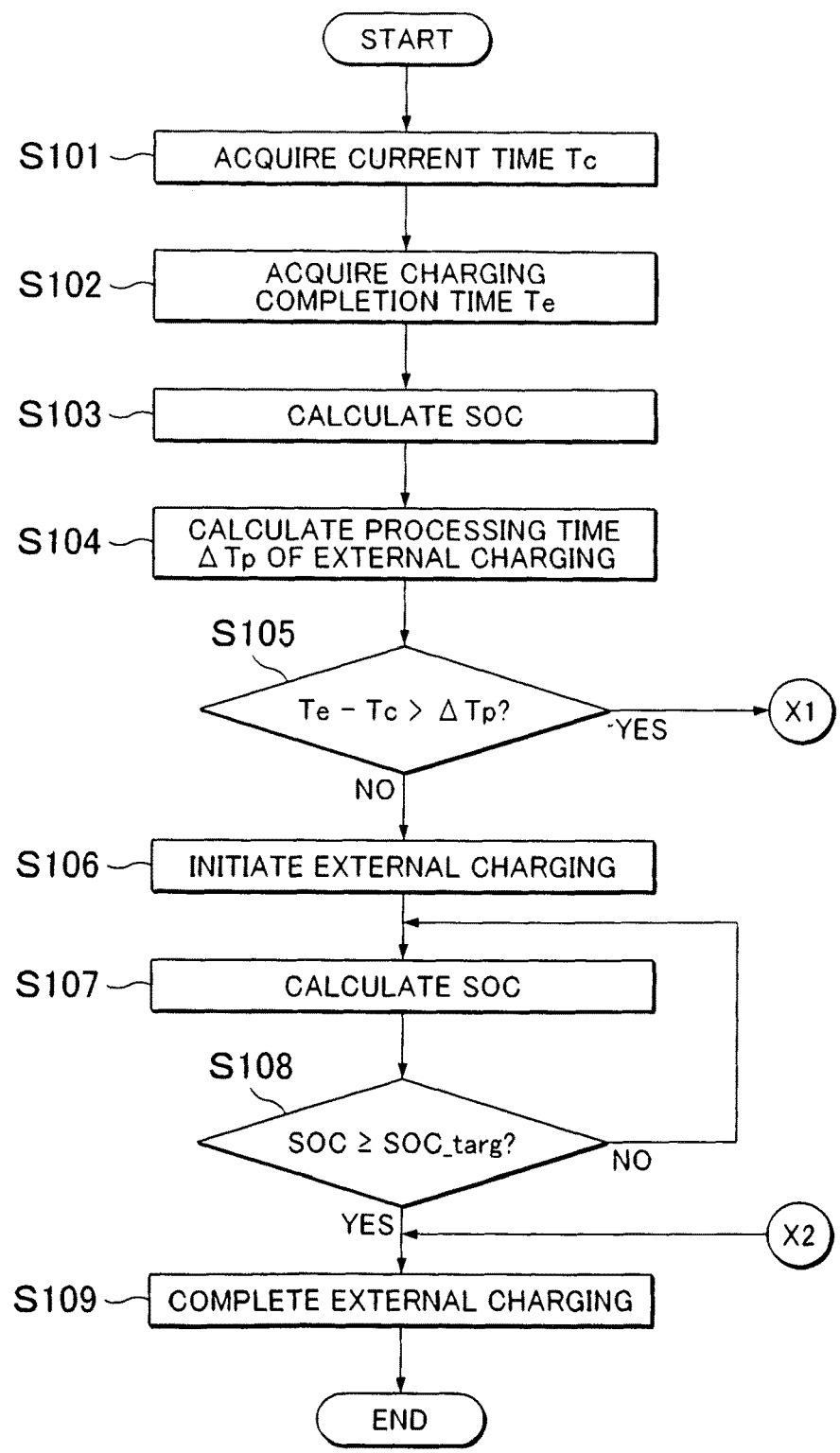
FIG. 3 is a flowchart that shows the process of carrying out external charging.
Figure 4A:
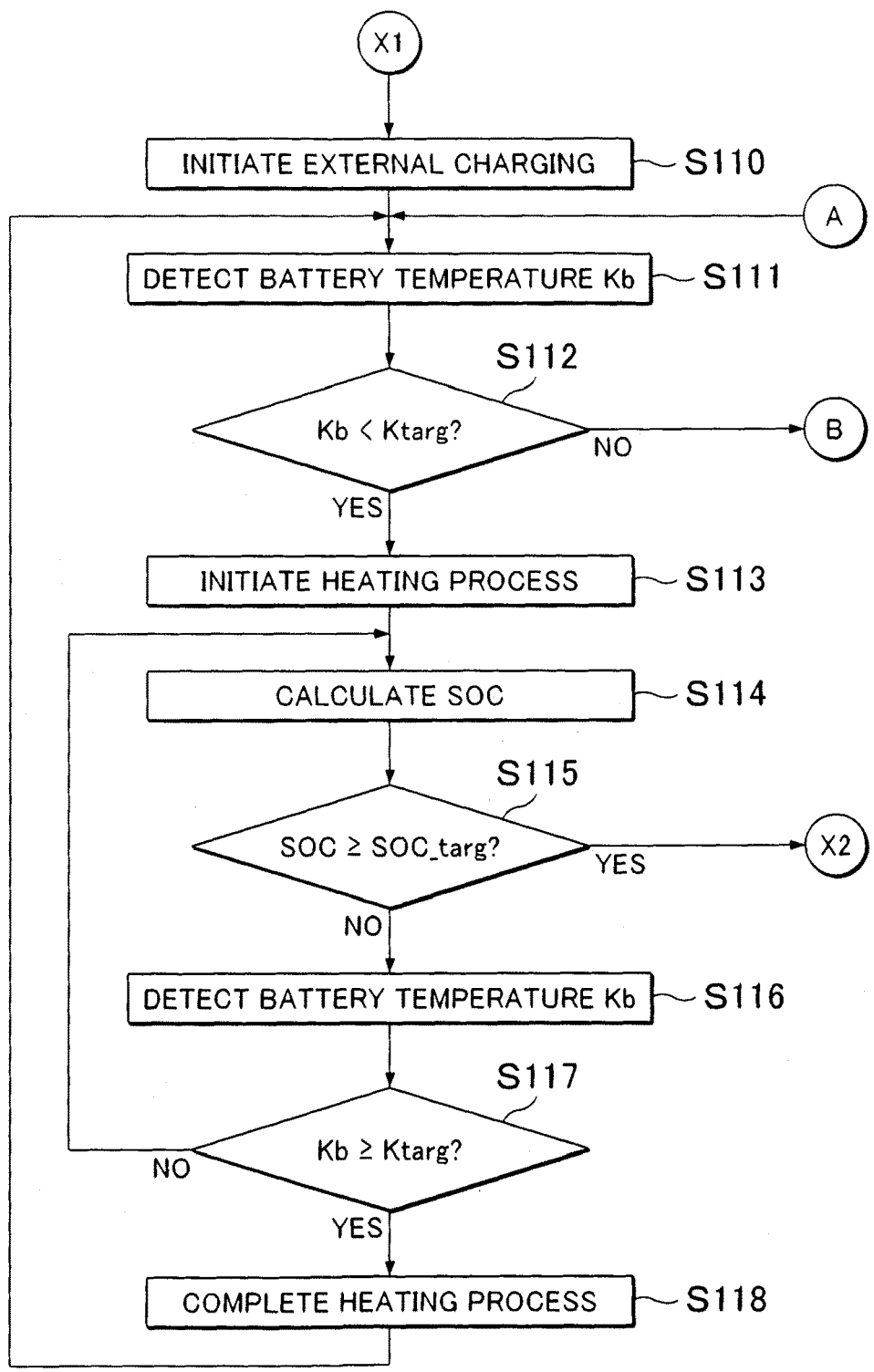
FIG. 4 is a flowchart that shows the process of carrying out external charging while adjusting the temperature of a battery pack.
Figure 4B:
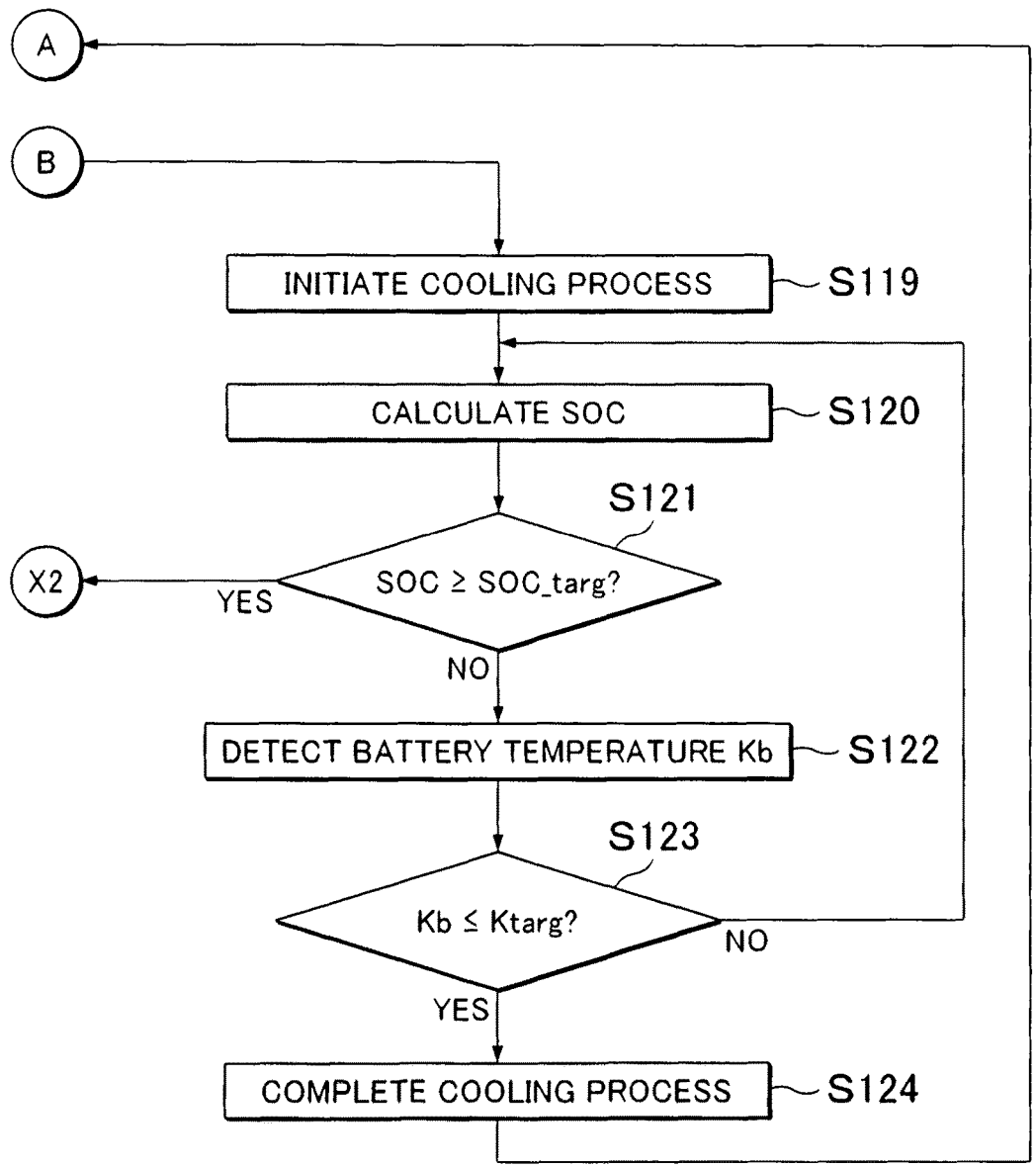

Next, the process of carrying out external charging and the process of adjusting the temperature of the battery pack 10 will be described with reference to the flowchart shown in FIG. 3 and FIG. 4. The process shown in FIG. 3 and FIG. 4 is executed by the controller 30. When the process shown in FIG. 3 and FIG. 4 is initiated, the plug 29 has been connected to the inlet 27. When the charging completion time Te and/or the operation-starting time TU have been set, the process shown in FIG. 3 and FIG. 4 is initiated.

In step S101, the controller 30 acquires current time Tc from the clock 32. In step S102, the controller 30 acquires the charging completion time Te on the basis of the input information from the input unit 34. In step S103, the controller 30 calculates a current state of charge (SOC) of the battery pack 10. The SOC is the ratio of a current level of charge to a full charge capacity. A known method may be used as needed as a method of calculating the SOC. It is possible to calculate the SOC of the battery pack 10 by using the detected results of the monitoring unit 20 and current sensor 22.

In step S104, the controller 30 calculates a processing time $\Delta Tp$ of external charging. The processing time $\Delta Tp$ is a time that is taken when the battery pack 10 is charged from the current SOC to an SOC at the time of completion of external charging (referred to as target value SOC_targ). A value calculated in the process of step S103 is used as the current SOC. The target value SOC_targ is set in advance. The target value SOC_targ may be stored in the memory 31 as a fixed value. The target value SOC_targ may be set by operating the input unit 34.

Because external charging is carried out at a constant current, a current integrated value is allowed to be calculated by multiplying the current value by a time (charging time), and a variation in SOC is allowed to be calculated from the current integrated value. The charging time during which a variation in SOC coincides with a differential between the current SOC and the target value SOC_targ is the processing time $\Delta Tp$. When the current value for carrying out external charging is set in advance, it is possible to calculate the processing time $\Delta Tp$ with the above-described method.

In step S105, the controller 30 determines whether a time between the current time Tc and the charging completion time Te is longer than the processing time $\Delta Tp$. The current time Tc and the charging completion time Te are respectively obtained in the processes of step S101 and step S102. The processing time $\Delta Tp$ is calculated in the process of step S104. When the time between the current time Tc and the charging completion time Te is longer than the processing time $\Delta Tp$, the controller 30 executes the process of step S110 shown in FIG. 4. On the other hand, when the time between the current time Tc and the charging completion time Te is shorter than or equal to the processing time $\Delta Tp$, the controller 30 determines that it is required to initiate external charging, and executes the process of step S106.

In step S106, the controller 30 initiates external charging. Thus, electric power is supplied from the commercial power supply 28 to the battery pack 10, and the SOC of the battery pack 10 increases. In step S107, the controller 30 calculates the SOC of the battery pack 10 during external charging. In step S108, the controller 30, determines whether the SOC calculated in the process of step S107 is higher than or equal to the target value SOC_targ.

When the SOC of the battery pack 10 is lower than the target value SOC_targ, the controller 30 continues external charging, and returns to the process of step S107. On the other hand, when the SOC of the battery pack 10 is higher than or equal to the target value SOC_targ, the controller 30 completes external charging by controlling the operation of the charger 26 in step S109.

When external charging is carried out through the processes of step S106 to step S109, it is possible to adjust the temperature Kb of the battery pack 10. Even when the time between the current time Tc and the charging completion time Te is shorter than or equal to the processing time $\Delta Tp$, part of electric power, which is supplied from the commercial power supply 28 to the battery pack 10, is allowed to be supplied to the temperature adjustment device 41 depending on, for example, the actual progress of external charging. Thus, it is possible to adjust the temperature Kb of the battery pack 10 by operating the temperature adjustment device 41.

When the controller 30 proceeds from the process of step S105 in FIG. 3 to the process of step S110 in FIG. 4, the controller 30 determines that it is possible to adjust the temperature Kb of the battery pack 10 while carrying out external charging. When the time between the current time Tc and the charging completion time Te is longer than the processing time ΔTp, it is possible to sufficiently ensure the time during which the temperature Kb of the battery pack 10 is adjusted.

Time at which the process from step S110 is initiated may be set as needed. That is, external charging just needs to be completed by the charging completion time Te. Specifically, it is possible to determine the time, at which the process from step S110 is initiated, in consideration of the processing time ΔTp and the charging completion time Te.

In step S110, the controller 30 initiates external charging. In step S111, the controller 30 detects the temperature (battery temperature) Kb of the battery pack 10 on the basis of the output of the temperature sensor 21. In step S112, the controller 30 determines whether the battery temperature Kb is lower than a target temperature Ktarg. The value detected in the process of step S111 is used as the battery temperature Kb.

The target temperature Ktarg is a temperature set in advance on the basis of the viewpoint of ensuring the input/output performance (charge/discharge performance) of the battery pack 10. Because the input/output performance of the battery pack 10 depends on the temperature Kb of the battery pack 10, an appropriate temperature for ensuring the input/output performance is allowed to be set as the target temperature Ktarg. Information regarding the target temperature Ktarg (information that specifies the target temperature Ktarg) may be stored in the memory 31.

When the output of the battery pack 10 is controlled, an upper limit value Wout at or below which the output power of the battery pack 10 is allowed is set, and the output of the battery pack 10 is controlled such that the output power of the battery pack 10 does not exceed the upper limit value Wout. When the input of the battery pack 10 is controlled, an upper limit value Win at or below which the input power of the battery pack 10 is allowed is set, and the input of the battery pack 10 is controlled such that the input power of the battery pack 10 does not exceed the upper limit value Win.

Figure 5:
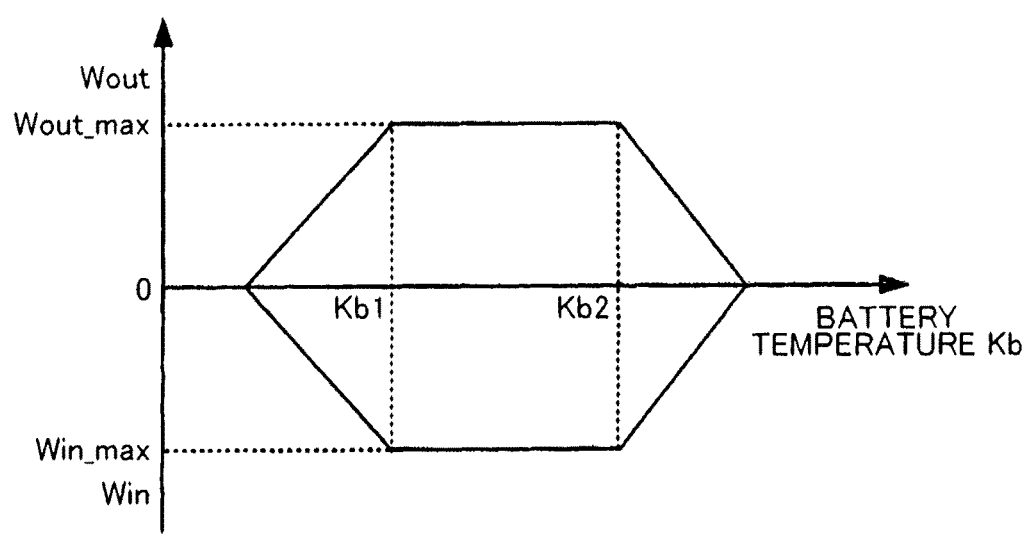
FIG. 5 is a graph that shows the correlation between input and output upper limit values and the temperature of the battery pack.

As shown in FIG. 5 (one example), the upper limit values Wout, Win change in response to the battery temperature Kb. Specifically, when the battery temperature Kb falls between temperatures Kb1, Kb2 (Kb1<Kb2), the upper limit values Wout, Win are respectively set to maximum values Wout_max, Win_max. When the battery temperature Kb is lower than the temperature Kb1, the upper limit values Wout, Win are respectively reduced from the maximum values Wout_max, Win_max. When the battery temperature Kb is higher than the temperature Kb2, the upper limit values Wout, Win are respectively reduced from the maximum values Wout_max, Win_max. A temperature at which the upper limit value Wout is reduced may be different from a temperature at which the upper limit value Win is reduced.

As is apparent from FIG. 5, when the battery temperature Kb falls between the temperatures Kb1, Kb2, the upper limit values Wout, Win are respectively set to the maximum values Wout_max, Win_max. Therefore, in order to ensure the input/output performance of the battery pack 10, the target temperature Ktarg is set to a value between the temperatures Kb1, Kb2. The target temperature Ktarg may be set to any temperature as needed as long as the temperature falls between the temperatures Kb1, Kb2.

When the temperatures Kb of the plurality of single cells 11 are detected and there are variations among these temperatures Kb, the average value of these temperatures Kb may be compared with the target temperature Ktarg or the lowest temperature Kb or the highest temperature Kb may be compared with the target temperature Ktarg.

In the process of step S112, when the battery temperature Kb is lower than the target temperature Ktarg, the controller 30 determines that it is required to heat the battery pack 10, and executes the process of step S113. The process from step S113 is the process of heating the battery pack 10. When there are variations among the temperatures Kb of the plurality of single cells 11, the average value of the temperatures Kb or the lowest temperature Kb may be compared with the target temperature Ktarg. When the average value or the lowest temperature Kb is lower than the target temperature Ktarg, the controller 30 determines that it is required to heat the battery pack 10.

In the process of step S112, when the battery temperature Kb is higher than or equal to the target temperature Ktarg, the controller 30 determines that it is required to cool the battery pack 10, and executes the process of step S119. The process from step S119 is the process of cooling the battery pack 10. When there are variations among the temperatures Kb of the plurality of single cells 11, the average value of the temperatures Kb or the highest temperature Kb may be compared with the target temperature Ktarg. When the average value or the highest temperature Kb is higher than the target temperature Ktarg, the controller 30 determines that it is required to cool the battery pack 10.

Initially, the process of heating the battery pack 10 will be described.

The controller 30 initiates the process of heating the battery pack 10 (heating process) in step S113. Specifically, the controller 30 operates the temperature adjustment device 41 in order to increase the temperature Kb of the battery pack 10. In step S114, the controller 30 calculates the SOC of the battery pack 10, and determines in step S115 whether the calculated SOC is higher than or equal to the target value SOC_targ. When the calculated SOC is higher than or equal to the target value SOC_targ, the controller 30 executes the process of step S109 shown in FIG. 3. When the controller 30 has proceeded from the process of step S115 to the process of step S109, the controller 30 completes external charging, and also completes the heating process. When the calculated SOC is lower than the target value SOC_targ, the controller 30 executes the process of step S116.

In step S116, the controller 30 detects the temperature Kb of the battery pack 10 on the basis of the output of the temperature sensor 21. In step S117, the controller 30 determines whether the battery temperature Kb detected in the process of step S116 is higher than or equal to the target temperature Ktarg. The target temperature Ktarg that is used in the process of step S117 is the same as the target temperature Ktarg that is used in the process of step S112.

When the battery temperature Kb is lower than the target temperature Ktarg, the controller 30 returns to the process of step S114. When the controller 30 has returned to the process of step S114, the controller 30 continues the heating process and external charging. When the battery temperature Kb is higher than or equal to the target temperature Ktarg, the controller 30 completes the heating process in step S118, and returns to the process of step S111. With the processes of step S113 to step S118, it is possible to cause the SOC of the battery pack 10 to reach the target value SOC_targ by the charging completion time Te. When the SOC of the battery pack 10 reaches the target value SOC_targ or before the SOC of the battery pack 10 reaches the target value SOC_targ, it is possible to cause the battery temperature Kb to reach the target temperature Ktarg.

Next, the process of cooling the battery pack 10 will be described.

The controller 30 initiates the process of cooling the battery pack 10 (cooling process) in step S119. Specifically, the controller 30 operates the temperature adjustment device 41 in order to reduce the temperature Kb of the battery pack 10. The controller 30 calculates the SOC of the battery pack 10 in step S120, and determines in step S121 whether the calculated SOC is higher than or equal to the target value SOC_targ. When the calculated SOC is higher than or equal to the target value SOC_targ, the controller 30 executes the process of step S109 shown in FIG. 3. When the controller 30 has proceeded from the process of step S121 to the process of step S109, the controller 30 completes external charging, and also completes the cooling process. When the calculated SOC is lower than the target value SOC_targ, the controller 30 executes the process of step S122.

In step S122, the controller 30 detects the temperature Kb of the battery pack 10 on the basis of the output of the temperature sensor 21. In step S123, the controller 30 determines whether the battery temperature Kb detected in the process of step S122 is lower than or equal to the target temperature Ktarg. The target temperature Ktarg is the same as the target temperature Ktarg described in the process of step S112. When the battery temperature Kb is higher than the target temperature Ktarg, the controller 30 returns to the process of step S120.

When the controller 30 has returned to the process of step S120, the controller 30 continues the cooling process and external charging. When the battery temperature Kb is lower than or equal to the target temperature Ktarg, the controller 30 completes the cooling process in step S124, and returns to the process of step S111. With the processes of step S119 to step S124, it is possible to cause the SOC of the battery pack 10 to reach the target value SOC_targ by the charging completion time Te. When the SOC of the battery pack 10 reaches the target value SOC_targ or before the SOC of the battery pack 10 reaches the target value SOC_targ, it is possible to cause the battery temperature Kb to reach the target temperature Ktarg.

Figure 6A:
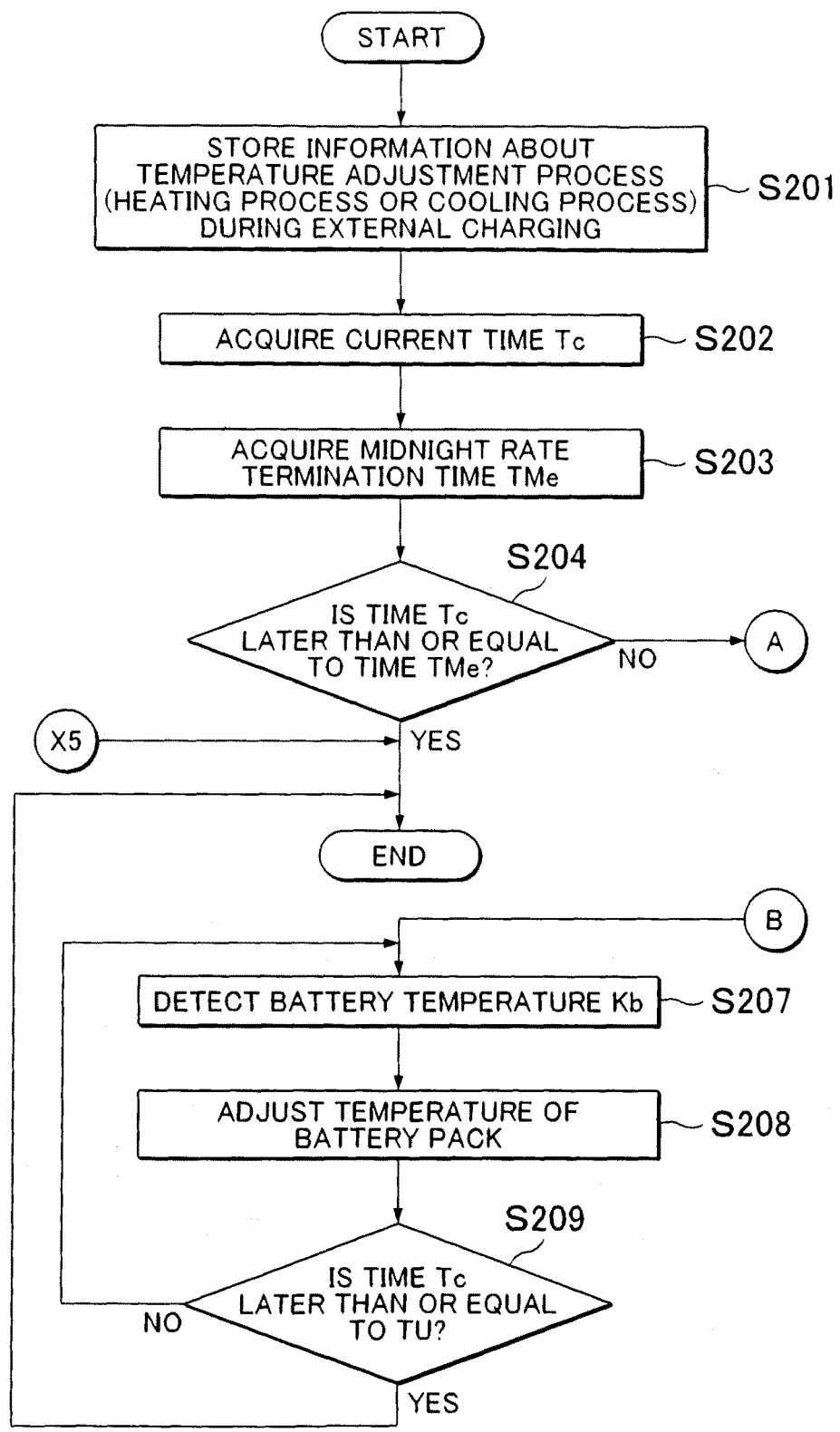
FIG. 6 is a flowchart that shows the process of adjusting the temperature of the battery pack after external charging.
Figure 6B:
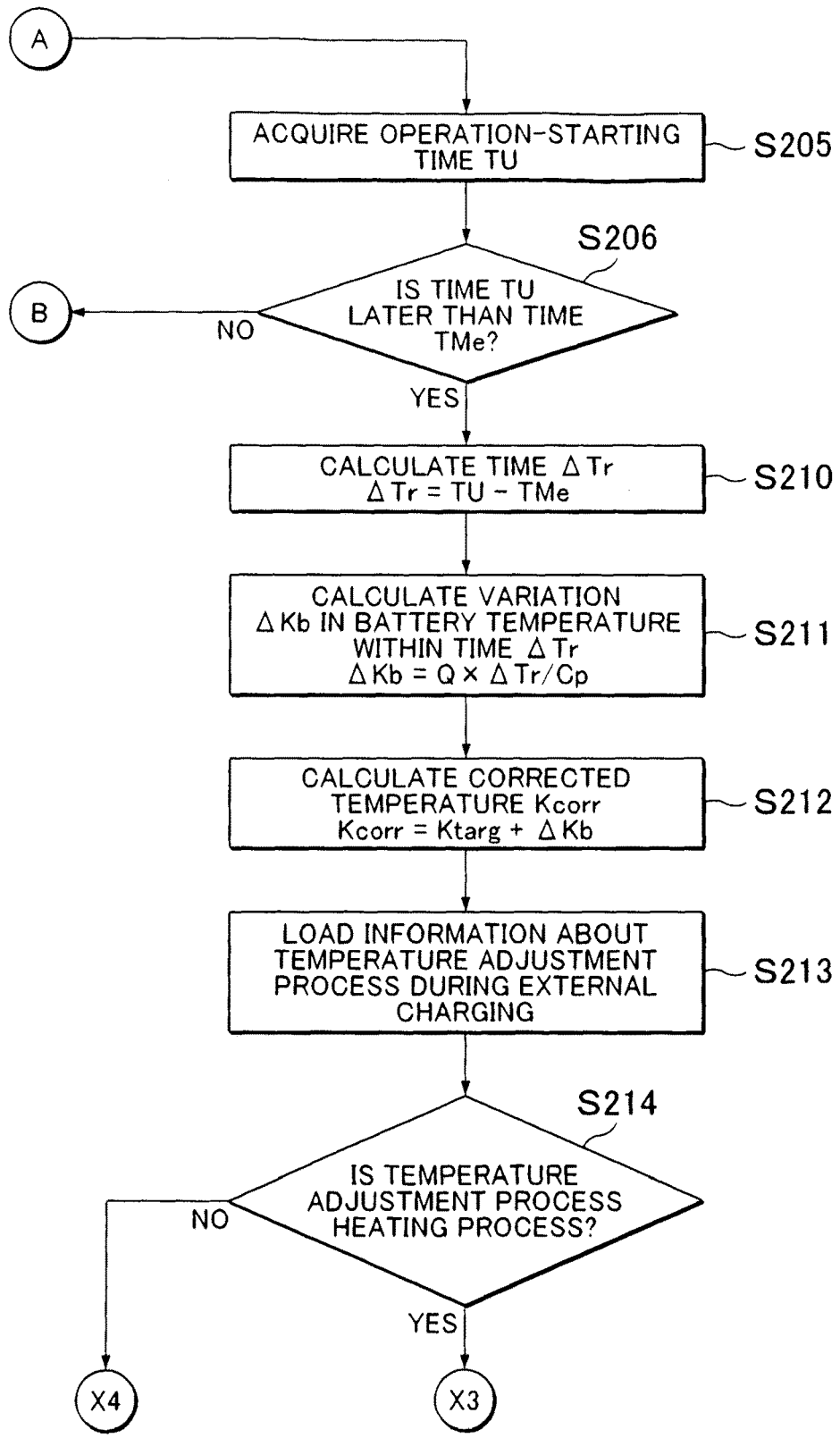
Figure 7:
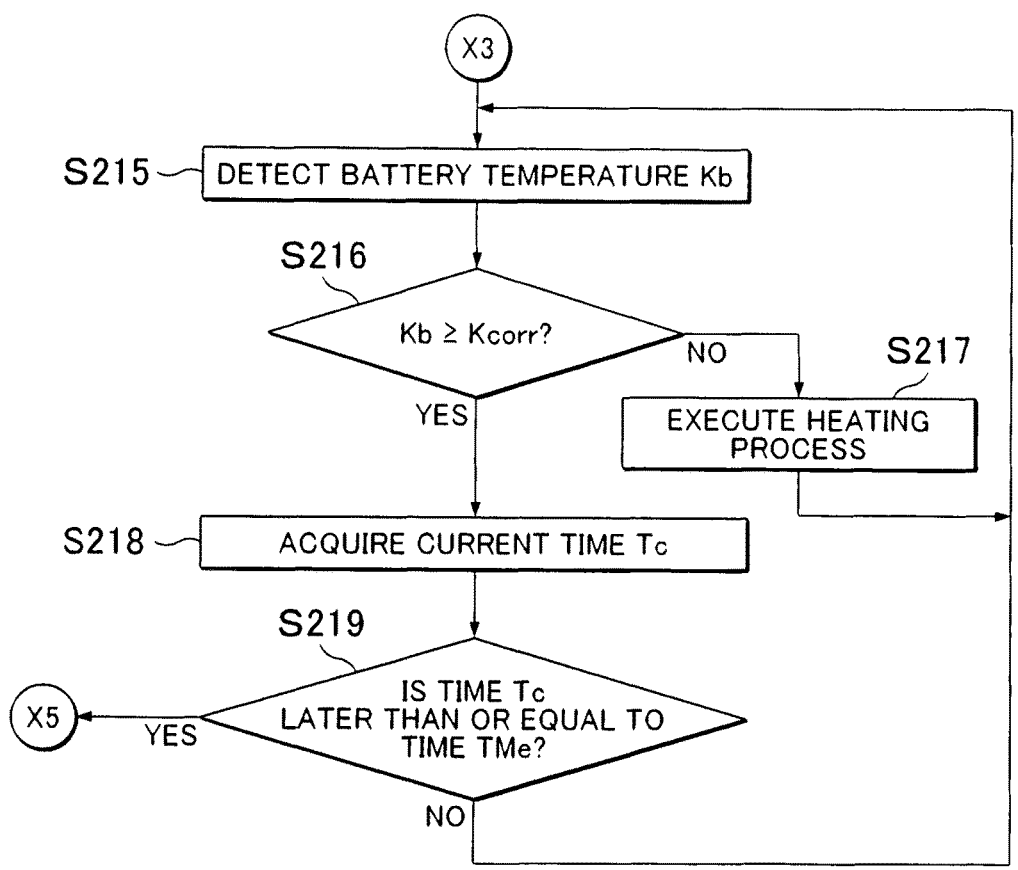
FIG. 7 is a flowchart that shows a heating process after external charging.
Figure 8:
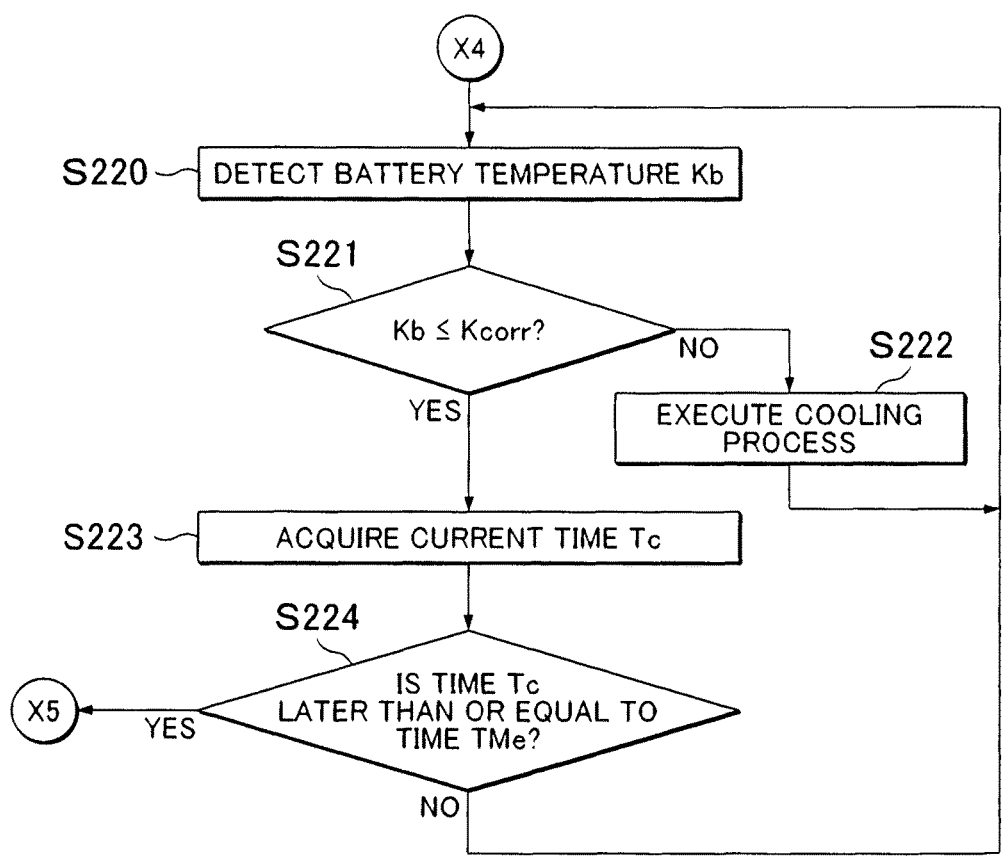
FIG. 8 is a flowchart that shows a cooling process after external charging.

Next, the process after completion of external charging will be described with reference to the flowchart shown in FIG. 6 to FIG. 8. The process shown in FIG. 6 to FIG. 8 is executed by the controller 30. The process shown in FIG. 6 to FIG. 8 is initiated at the time when the process shown in FIG. 4 is executed.

In step S201, the controller 30 stores information about the temperature adjustment process during external charging in the memory 31. The temperature adjustment process includes the heating process (S113 to S118) and the cooling process (S119 to S124), described in the process shown in FIG. 4.

In step S202, the controller 30 acquires current time Tc from the clock 32. In step S203, the controller 30 acquires the midnight rate termination time TMe on the basis of the information input through the input unit 34. In step S204, the controller 30 determines whether the current time Tc is later than or equal to the midnight rate termination time TMe. The current time Tc and the midnight rate termination time TMe are respectively obtained in the processes of step S202 and step S203.

When the current time Tc is later than the midnight rate termination time TMe, the controller 30 completes the process shown in FIG. 6 to FIG. 8. On the other hand, when the current time Tc is earlier than the midnight rate termination time TMe, the controller 30 acquires the operation-starting time TU, input from the input unit 34, in step S205.

In step S206, the controller 30 determines whether the operation-starting time TU is later than the midnight rate termination time TMe. When the operation-starting time TU is earlier than or equal to the midnight rate termination time TMe, the controller 30 executes the process of step S207. On the other hand, when the operation-starting time TU is later than the midnight rate termination time TMe, the controller 30 executes the process of step S210.

In step S207, the controller 30 detects the temperature Kb of the battery pack 10 on the basis of the output of the temperature sensor 21. In step S208, the controller 30 adjusts the temperature of the battery pack 10 on the basis of the battery temperature Kb detected in the process of step S207. Specifically, when the battery temperature Kb is lower than the target temperature Ktarg, the controller 30 brings the battery temperature Kb close to the target temperature Ktarg through the heating process caused by the operation of the temperature adjustment device 41. On the other hand, when the battery temperature Kb is higher than the target temperature Ktarg, the controller 30 brings the battery temperature Kb close to the target temperature Ktarg through the cooling process caused by the operation of the temperature adjustment device 41. When the battery temperature Kb is the target temperature Ktarg, neither the heating process nor the cooling process is executed. When the temperature adjustment device 41 is operated, electric power from the commercial power supply 28 is used.

In step S209, the controller 30 acquires the current time Tc from the clock 32, and determines whether the current time Tc is later than or equal to the operation-starting time TU. When the current time Tc is later than or equal to the operation-starting time TU, the controller 30 completes the process shown in FIG. 6 to FIG. 8. On the other hand, when the current time Tc is earlier than the operation-starting time TU, the controller 30 returns to the process of step S207. When the operation-starting time TU is earlier than or equal to the midnight rate termination time TMe, it is possible to cause the battery temperature Kb at the operation-starting time TU to reach the target temperature Ktarg through the processes of step S207 to step S209.

When the controller 30 has proceeded from the process of step S206 to the process of step S210, the controller 30 calculates a time ΔTr between the operation-starting time TU and the midnight rate termination time TMe. In step S211, the controller 30 calculates a variation ΔKb in the battery temperature Kb. The temperature variation ΔKb is a variation in the battery temperature Kb in the period from the midnight, rate termination time TMe to the operation-starting time TU. Specifically, the temperature variation ΔKb indicates a value obtained by subtracting the battery temperature Kb of the midnight rate termination time TMe from the battery temperature Kb of the operation-starting time TU.

In the present embodiment, as will be described later, the temperature of the battery pack 10 is adjusted until the midnight rate termination time TMe; however, the temperature of the battery pack 10 is not adjusted after the midnight rate termination time TMe. Therefore, the temperature variation ΔKb in the period between the midnight rate termination time TMe and the operation-starting time TU depends on the outside air temperature Ke, and it is possible to estimate the temperature variation ΔKb on the basis of the outside air temperature Ke.

Specifically, the temperature variation ΔKb may be calculated on the basis of the following mathematical expression (1).

$$\Delta Kb = \frac{Q \times \Delta Tr}{Cp} \qquad (1)$$

In the above mathematical expression (1), Q (in watts (W)) is the heat radiation amount or heat receiving amount of the battery pack 10. The amount of heat Q is calculated on the basis of the battery temperature Kb and the outside air temperature Ke. That is, it is possible to calculate the amount of heat Q by detecting the battery temperature Kb and the outside air temperature Ke. When the battery temperature Kb is higher than the outside air temperature Ke, heat of the battery pack 10 is released to the air. Therefore, it is possible to calculate the heat radiation amount Q on the basis of the difference between the battery temperature Kb and the outside air temperature Ke. For example, when the correlation between the heat radiation amount Q and the difference between the battery temperature Kb and the outside air temperature Ke is prepared as a map or an arithmetic expression, it is possible to calculate the heat radiation amount Q from the difference between the battery temperature Kb and the outside air temperature Ke.

On the other hand, when the battery temperature Kb is lower than the outside air temperature Ke, the battery pack 10 receives heat from the air. Therefore, it is possible to calculate the heat receiving amount Q on the basis of the difference between the battery temperature Kb and the outside air temperature Ke. For example, when the correlation between the heat receiving amount Q and the difference between the battery temperature Kb and the outside air temperature Ke is prepared as a map or an arithmetic expression, it is possible to calculate the heat receiving amount Q from the difference between the battery temperature Kb and the outside air temperature Ke.

In the present embodiment, the heat radiation amount Q is defined as a positive value, and the heat receiving amount Q is defined as a negative value. Therefore, when the heat radiation amount Q is calculated, the temperature variation $\Delta Kb$ becomes a positive value. When the heat receiving amount Q is calculated, the temperature variation $\Delta Kb$ becomes a negative value. When the temperature variation $\Delta Kb$ is a positive value, the battery temperature Kb increases in the period from the midnight rate termination time TMe to the operation-starting time. TU. When the temperature variation $\Delta Kb$ is a negative value, the battery temperature Kb decreases in the period from the midnight rate termination time TMe to the operation-starting time TU.

In the above mathematical expression (1), Cp is the heat capacity (in J/° C.) of the battery pack 10. The heat capacity Cp may be measured in advance by an experiment, or the like. Information about the heat capacity Cp (information that specifies the heat capacity Cp) may be stored in the memory 31. In the above mathematical expression (1), $\Delta Tr$ is a time calculated in the process of step S210.

In step S212, the controller 30 calculates a corrected temperature Kcorr. Specifically, the corrected temperature Kcorr is calculated on the basis of the following mathematical expression (2). In the following mathematical expression (2), Ktarg is the target temperature described in the process shown in FIG. 4, and $\Delta Kb$ is the temperature variation calculated in the process of step S211.

$$Kcorr = Ktarg + \Delta Ktb \qquad (2)$$

In step S213, the controller 30 loads the information about the temperature adjustment process, stored in the memory 31. The information about the temperature adjustment process is information stored in the memory 31 in the process of step S201. In step S214, the controller 30 determines whether the temperature adjustment process loaded in the process of step S213 is the heating process. When the loaded temperature adjustment process is the heating process, the controller 30 executes the process of step S215 shown in FIG. 7. On the other hand, when the loaded temperature adjustment process is the cooling process, the controller 30 executes the process of step S220 shown in FIG. 8.

In step S215, the controller 30 detects the battery temperature Kb on the basis of the output of the temperature sensor 21. In step S216, the controller 30 determines whether the battery temperature Kb detected in the process of step S215 is higher than or equal to the corrected temperature Kcorr. The value calculated in the process of step S212 shown in FIG. 6 is used as the corrected temperature Kcorr.

When the controller 30 proceeds from the process of step S214 shown in FIG. 6 to the process of step S215 shown in FIG. 7, the controller 30 has determined that the heating process has been executed during external charging. When the heating process has been executed during external charging, the battery temperature Kb tends to be higher than the outside air temperature Ke, and Q shown in the above-described mathematical expression (1) becomes the heat radiation amount. Therefore, the temperature variation $\Delta Kb$ becomes a positive value, and the corrected temperature Kcorr is higher than the target temperature Ktarg by the temperature variation $\Delta Kb$.

When the battery temperature Kb is lower than the corrected temperature Kcorr, the controller 30 executes the process of step S217. On the other hand, when the battery temperature Kb is higher than or equal to the corrected temperature Kcorr, the controller 30 executes the process of step S218. In step S217, the controller 30 executes the heating process by operating the temperature adjustment device 41. By executing the heating process, it is possible to cause the battery temperature Kb to reach the corrected temperature Kcorr by increasing the battery temperature Kb. After the process of step S217, the controller 30 returns to the process of step S215. In step S218, the controller 30 acquires the current time Tc from the clock 32.

In step S219, the controller 30 determines whether the current time Tc acquired in the process of step S218 is later than or equal to the midnight rate termination time TMe. When the current time Tc is later than or equal to the midnight rate termination time TMe, the controller 30 completes the process shown in FIG. 6 to FIG. 8. On the other hand, when the current time Tc is earlier than the midnight rate termination time TMe, the controller 30 returns to the process of step S215.

In step S220 shown in FIG. 8, the controller 30 detects the battery temperature Kb on the basis of the output of the temperature sensor 21. In step S221, the controller 30 determines whether the battery temperature Kb detected in the process of step S220 is lower than or equal to the corrected temperature Kcorr. The value calculated in the process of step S212 shown in FIG. 6 is used as the corrected temperature Kcorr. When the controller 30 proceeds from the process of step S214 shown in FIG. 6 to the process of step S220 shown in FIG. 8, the controller 30 has determined that the cooling process has been executed during external charging. When the cooling process has been executed during external charging, the battery temperature Kb tends to be lower than the outside air temperature Ke, and Q shown in the above-described mathematical expression (1) becomes the heat receiving amount. Therefore, the temperature variation. ΔKb becomes a negative value, and the corrected temperature Kcorr is lower than the target temperature Ktarg by the temperature variation ΔKb.

When the battery temperature Kb is higher than the corrected temperature Kcorr, the controller 30 executes the process of step S222. When the battery temperature Kb is lower than or equal to the corrected temperature Kcorr, the controller 30 executes the process of step S223. In step S222, the controller 30 executes the cooling process by operating the temperature adjustment device 41. By executing the cooling process, it is possible to cause the battery temperature Kb to reach the corrected temperature Kcorr by reducing the battery temperature Kb. After the process of step S222, the controller 30 returns to the process of step S220. In step S223, the controller 30 acquires the current time Tc from the clock 32.

In step S224, the controller 30 determines whether the current time Tc acquired in the process of step S223 is later than or equal to the midnight rate termination time TMe. When the current time Tc is later than or equal to the midnight rate termination time TMe, the controller 30 completes the process shown in FIG. 6 to FIG. 8. On the other hand, when the current time Tc is earlier than the midnight rate termination time TMe, the controller 30 returns to the process of step S220.

Figure 9:
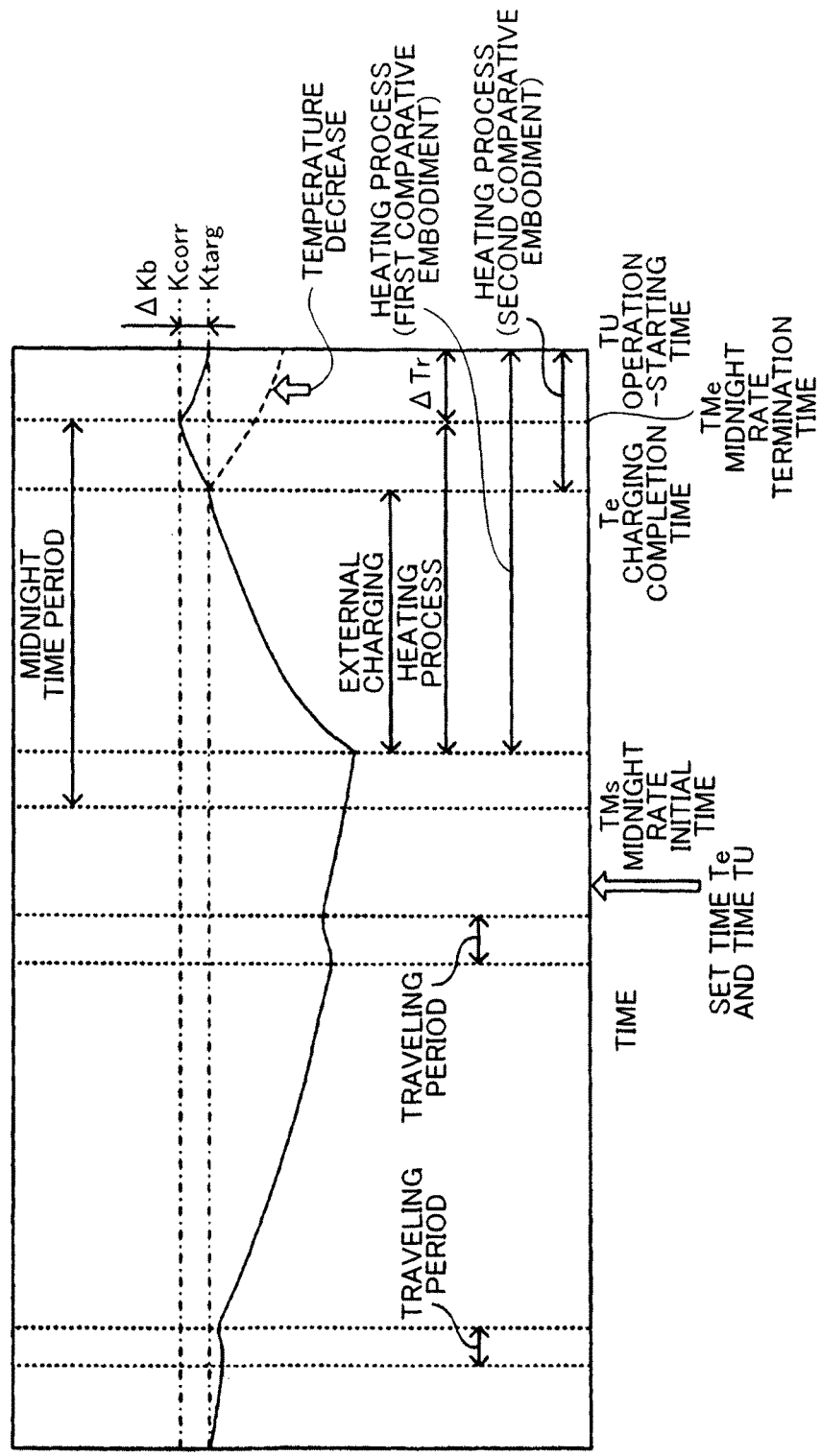
FIG. 9 is a time chart that shows a change in battery temperature at the time when the heating process is executed.

FIG. 9 shows a change in the battery temperature Kb in winter, or the like. In FIG. 9, the ordinate axis represents battery temperature Kb, and the abscissa axis represents time. In the example shown in FIG. 9, a period during which the vehicle is traveling, a period during which external charging is being carried out and a period during which the heating process is being executed are shown. In the period during which external charging is being carried out, the heating process is also being executed.

The charging completion time Te and the operation-starting time TU are set by the user, and the charging completion time Te and the operation-starting time TU are set earlier than the midnight rate initial time TMs. The charging completion time Te is earlier than the midnight rate termination time TMe. The operation-starting time TU is later than the midnight rate termination time TMe.

In FIG. 9, in the period during which the vehicle is not traveling, the battery temperature Kb is decreasing because the battery pack 10 receives thermal influence from the surrounding environment. That is, because the outside air temperature Ke is lower than the battery temperature Kb, the battery temperature Kb is decreasing upon reception of the influence of the outside air temperature Ke. In the period during which the vehicle is traveling, a decrease in the battery temperature Kb is suppressed by adjusting the temperature of the battery pack 10.

In FIG. 9, because the heating process is also being executed at the time when external charging is carried out, the battery temperature Kb increases. With the process shown in FIG. 4, it is possible to cause the battery temperature Kb to reach the target temperature Ktarg by the charging completion time Te, in other words, by the time when external charging completes. In the example shown in FIG. 9, after passage of the charging completion time Te as well, the heating process is executed on the basis of the process shown in FIG. 6 and FIG. 7 until the midnight rate termination time TMe, and the battery temperature Kb is increased to the corrected temperature Kcorr. When the heating process is stopped at the midnight rate termination time TMe, the battery temperature Kb decreases in response to the outside air temperature Ke, and this amount of decrease becomes ΔKb.

Because the corrected temperature Kcorr is higher than the target temperature Ktarg by the temperature variation ΔKb, even when the battery temperature Kb decreases, it is possible to bring the battery temperature Kb at the operation-starting time TU to the target temperature Ktarg. If the heating process is stopped at the charging completion time Te shown in FIG. 9, the battery temperature Kb continues to decrease as indicated by the dashed line in FIG. 9 upon reception of the influence of the outside air temperature Ke. As a result, the battery temperature Kb at the operation-starting time TU becomes lower than the target temperature Ktarg.

If the battery temperature Kb at the operation-starting time TU becomes lower than the target temperature Ktarg, it becomes difficult to ensure the input/output performance of the battery pack 10 at the time of initiating a start-up of the vehicle at the operation-starting time TU. In the present embodiment, it is possible to bring the battery temperature Kb at the operation-starting time TU to the target temperature Ktarg, so it is possible to prevent the battery temperature Kb from being lower than the target temperature Ktarg. Thus, at the operation-starting time TU, it is possible to ensure the input/output performance of the battery pack 10.

Figure 10:
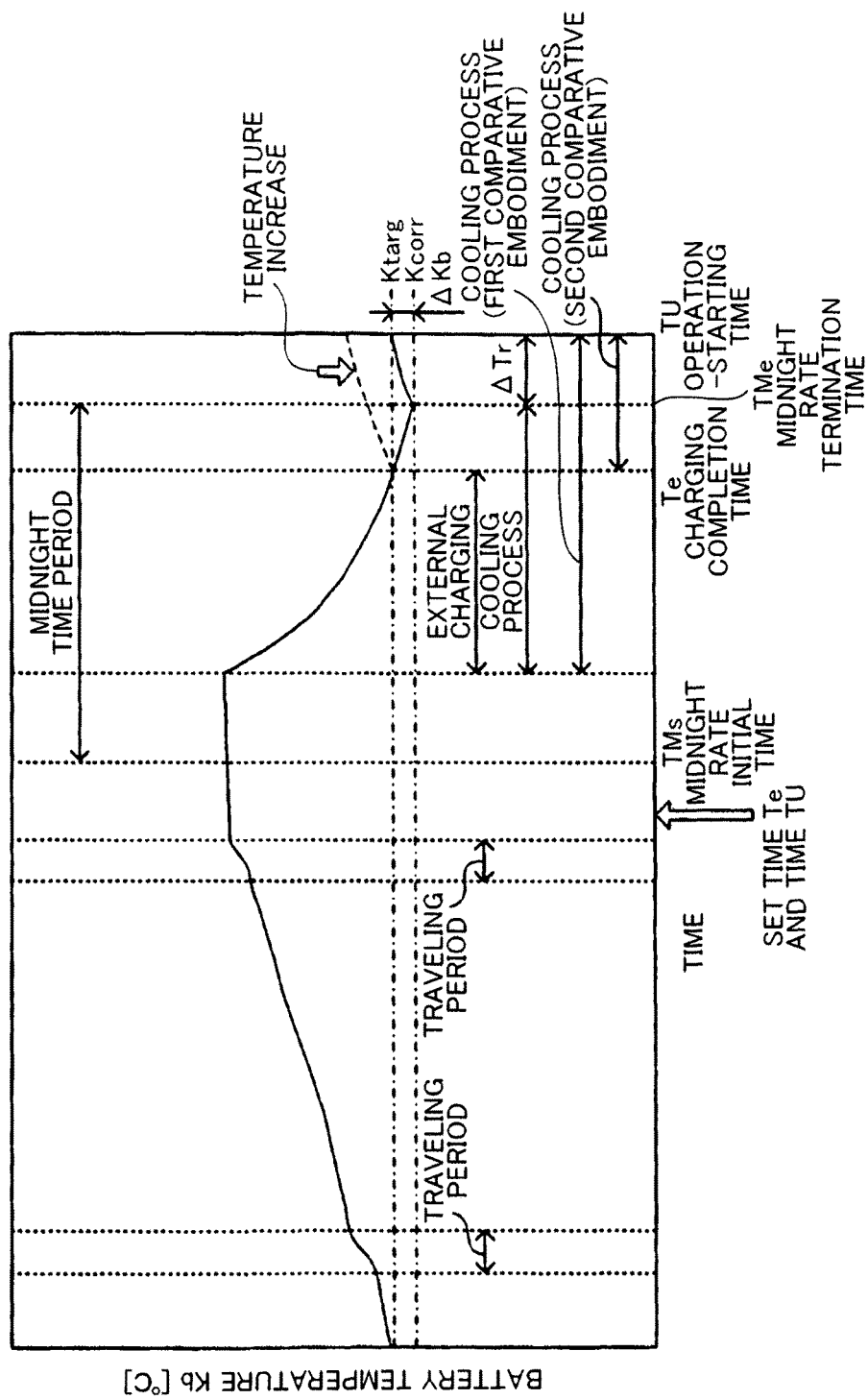
FIG. 10 is a time chart that shows a change in battery temperature at the time when the cooling process is executed.

FIG. 10 shows a change in the battery temperature Kb in summer, or the like. In FIG. 10, the ordinate axis represents battery temperature Kb, and the abscissa axis represents time. In the example shown in FIG. 10, a period during which the vehicle is traveling, a period during which external charging is being carried out and a period during which the cooling process is being executed are shown. In the period during which external charging is being carried out, the cooling process is also being executed.

The charging completion time Te and the operation-starting time TU are set by the user, and the charging completion time Te and the operation-starting time TU are set earlier than the midnight rate initial time TMs. The charging completion time Te is earlier than the midnight rate termination time TMe. The operation-starting time TU is later than the midnight rate termination time TMe.

In FIG. 10, in the period during which the vehicle is not traveling, the battery temperature Kb is increasing because the battery pack 10 receives thermal influence from the surrounding environment. That is, because the outside air temperature Ke is higher than the battery temperature Kb, the battery temperature Kb is increasing upon reception of the influence of the outside air temperature Ke. In the period during which the vehicle is traveling, an increase in the battery temperature Kb is suppressed by adjusting the temperature of the battery pack 10.

In FIG. 10, because the cooling process is also being executed when external charging is carried out, the battery temperature Kb decreases. With the process shown in FIG. 4, it is possible to cause the battery temperature Kb to reach the target temperature Ktarg by the charging completion time Te, in other words, by the time when external charging completes. In the example shown in FIG. 10, after passage of the charging completion time Te as well, the cooling process is executed on the basis of the process shown in FIG. 6 and FIG. 8 until the midnight rate termination time TMe, and the battery temperature Kb is reduced to the corrected temperature Kcorr.

Because the corrected temperature Kcorr is lower than the target temperature Ktarg by the temperature variation ΔKb, even when the battery temperature Kb increases upon reception of the influence of the outside air temperature Ke after the midnight rate termination time TMe, it is possible to bring the battery temperature Kb at the operation-starting time TU to the target temperature Ktarg. If the cooling process is stopped after the charging completion time Te shown in FIG. 10, the battery temperature Kb continues to increase upon reception of the influence of the outside air temperature Ke as indicated by the dashed line in FIG. 10. As a result, the battery temperature Kb at the operation-starting time TU becomes higher than the target temperature Ktarg.

If the battery temperature Kb at the operation-starting time TU becomes higher than the target temperature Ktarg, it may be difficult to ensure the input/output performance of the battery pack 10 at the time of initiating a start-up of the vehicle at the operation-starting time TU.

In the present embodiment, it is possible to bring the battery temperature Kb at the operation-starting time TU to the target temperature Ktarg, so it is possible to prevent the battery temperature Kb from being higher than the target temperature Ktarg. Thus, at the operation-starting time TU, it is possible to ensure the input/output performance of the battery pack 10.

According to FIG. 9 and FIG. 10, electric power in the midnight time period is used to carry out external charging or executing the temperature adjustment process of the battery pack 10. The cost of electricity of the midnight time period is lower than the cost of electricity of a time period other than the midnight time period. Therefore, it is possible to reduce the cost of electricity at the time of carrying out external charging or executing the temperature adjustment process.

On the other hand, because the temperature adjustment process of the battery pack 10 is not carried out at the midnight rate termination time TMe or later, if the operation-starting time TU is later than the midnight rate termination time TMe, the battery temperature Kb may change in the period from the midnight rate termination time TMe to the operation-starting time TU. Specifically, the battery temperature Kb may increase or decrease in response to the temperature of the surrounding environment of the battery pack 10 (outside air temperature Ke). Therefore, in the present embodiment, the corrected temperature Kcorr is set in consideration of the heat radiation amount or heat receiving amount of the battery pack 10 in the period from the midnight rate termination time TMe to the operation-starting time TU.

When the battery temperature Kb at the midnight rate termination time TMe is caused to reach the corrected temperature Kcorr, it is possible to bring the battery temperature Kb at the operation-starting time TU to the target temperature Ktarg. For example, when the battery temperature Kb decreases in the period from the midnight rate termination time TMe to the operation-starting time TU, it is possible to bring the battery temperature Kb at the operation-starting time TU to the target temperature Ktarg by causing the battery temperature Kb at the midnight rate termination time TMe to be higher than the target temperature Ktarg by the temperature variation $\Delta$Kb.

On the other hand, when the battery temperature Kb increases in the period from the midnight rate termination time TMe to the operation-starting time TU, it is possible to bring the battery temperature Kb at the operation-starting time TU to the target temperature Ktarg by causing the battery temperature Kb at the midnight rate termination time TMe to be lower than the target temperature Ktarg by the temperature variation $\Delta$Kb. Thus, at the time of initiating a start-up of the vehicle, it is possible to bring the battery temperature Kb to the target temperature Ktarg, so it is possible to ensure the input/output performance of the battery pack 10 at the time of a start-up of the vehicle.

In order to bring the battery temperature Kb at the operation-starting time TU to the target temperature Ktarg, it is conceivable to execute the temperature adjustment process (the heating process or the cooling process) by the operation-starting time TU as in the case of first and second comparative embodiments shown in FIG. 9 and FIG. 10. If the temperature adjustment process is executed in the period from the initiation of external charging to the operation-starting time TU as in the case of the first comparative embodiment, electric power from the commercial power supply 28 is used at a rate higher than the midnight cost of electricity also in the period between the midnight rate termination time TMe and the operation-starting time TU. Thus, in the first comparative embodiment, a cost of electricity required for the temperature adjustment process increases as compared to the present embodiment.

If the temperature adjustment process is executed in the period from the charging completion time Te to the operation-starting time TU as in the case of the second comparative embodiment, electric power from the commercial power supply 28 is used at a rate higher than the midnight cost of electricity in the period between the midnight rate termination time TMe and the operation-starting time TU. If the duration of the temperature adjustment process according to the second comparative embodiment is longer than or equal to the duration of the temperature adjustment process according to the present embodiment, a cost of electricity required for the temperature adjustment process increases in the second comparative embodiment as compared to the present embodiment. If the duration of the temperature adjustment process according to the second comparative embodiment is shorter than the duration of the temperature adjustment process according to the present embodiment, a larger amount of electric power should be used in order to bring the battery temperature Kb to the target temperature Ktarg. Thus, in the second comparative embodiment, a cost of electricity required for the temperature adjustment process tends to be higher than that of the present embodiment.

In the present embodiment, the target temperature Ktarg is set to a specific temperature; however, the target temperature Ktarg is not limited to this configuration. Specifically, instead of the target temperature Ktarg, it is possible to set a specific temperature range (referred to as target temperature range). In this case, it is possible to execute the temperature adjustment process of the battery pack 10 such that the temperature Kb of the battery pack 10 falls within the target temperature range. When the target temperature range is set, an upper limit value and a lower limit value are set, and the range between the upper limit value and the lower limit value becomes the target temperature range.

In the process shown in FIG. 4, when the battery temperature Kb is lower than the lower limit vale of the target temperature range, the heating process may be executed. Specifically, it is possible to set the lower limit value of the target temperature range as the target temperature Ktarg described in the processes of step S112 and step S117. On the other hand, at the time of executing the process shown in FIG. 4, when the battery temperature Kb is higher than the upper limit value of the target temperature range, the cooling process may be executed. Specifically, it is possible to set the upper limit value of the target temperature range as the target temperature Ktarg described in the processes of step S112 and step S123.

In the process shown in FIG. 6 to FIG. 8, when the heating process is executed at the charging completion time Te or later, a temperature obtained by adding the temperature variation ΔKb to the upper limit value of the target temperature range may be set as the corrected temperature Kcorr. When the heating process is executed in the period from the charging completion time Te to the midnight rate termination time TMe, the battery temperature Kb tends to decrease at the midnight rate termination time TMe or later. When the corrected temperature Kcorr is set to a temperature higher than the upper limit value of the target temperature range by the temperature variation ΔKb, it is possible to bring the battery temperature Kb at the operation-starting time TU to the upper limit value of the target temperature range. Even when the battery temperature Kb is easy to decrease and the actual temperature variation ΔKb becomes larger than the estimated temperature variation ΔKb, it is possible to bring the battery temperature Kb at the operation-starting time TU into the target temperature range.

On the other hand, when the cooling process is executed at the charging completion time Te or later, a temperature obtained by subtracting the temperature variation ΔKb from the lower limit value of the target temperature range may be set as the corrected temperature Kcorr. When the cooling process is executed in the period from the charging completion time Te to the midnight rate termination time TMe, the battery temperature Kb tends to increase at the midnight rate termination time TMe or later. If the corrected temperature Kcorr is set to a temperature lower than the lower limit value of the target temperature range by the temperature variation ΔKb, it is possible to bring the battery temperature Kb at the operation-starting time TU to the lower limit value of the target temperature range. Even when the battery temperature Kb is easy to increase and the actual temperature variation ΔKb becomes larger than the estimated temperature variation ΔKb, it is possible to bring the battery temperature Kb at the operation-starting time TU into the target temperature range.

It is possible to set the corrected temperature Kcorr in consideration of an upper limit temperature that is allowed in the battery pack 10 (referred to as allowable upper limit temperature). The allowable upper limit temperature is a temperature for protecting the battery pack 10 from excessive heat generation. When the corrected temperature Kcorr is higher than the allowable upper limit temperature, the battery pack 10 excessively generates heat because of the heating process at the charging completion time Te or later. Therefore, when the corrected temperature Kcorr is higher than the allowable upper limit temperature, it is possible to set the allowable upper limit temperature as the corrected temperature Kcorr that is used in the process of step S216 shown in FIG. 7. The allowable upper limit temperature may be set in advance, and information about the allowable upper limit temperature (information that specifies the allowable upper limit temperature) may be stored in the memory 31.

The charging completion time Te is set by the user. When the charging completion time Te is included in the midnight time period, it is possible to carry out external charging with electric power of the midnight time period. A user who considers the midnight time period may set the time included in the midnight time period as the charging completion time Te.

On the other hand, some users may set the charging completion time Te without consideration of the midnight time period. For example, the set charging completion time Te may be later than the midnight rate termination time TMe. In this case, when it is possible to complete external charging by the midnight rate termination time TMe, it is possible to complete external charging by the midnight rate termination time TMe. Thus, it is possible to carry out eternal charging by sufficiently utilizing electric power from the commercial power supply 28 in the midnight time period, so it is possible to reduce a cost of electricity required to carry out external charging.

However, external charging may be completed after the midnight rate termination time TMe. Specifically, when the charging completion time Te is later than the midnight rate termination time TMe, it is possible to complete external charging at any time in the period from the midnight rate termination time TMe to the charging completion time Te. In this case, external charging is carried out in the midnight time period and the time period other than the midnight time period. When the duration of external charging in the midnight time period is longer than the duration of external charging in the time period other than the midnight time period, it is possible to carry out external charging by actively using electric power from the commercial power supply 28 in the midnight time period. Thus, it is easy to reduce a cost of electricity required to carry out external charging.

However, when external charging is carried out even at the midnight rate termination time TMe or later, as a time from the midnight rate termination time TMe until external charging is completed extends, the duration of external charging extends in the time period other than the midnight time period. In this case, a cost of electricity required to carry out external charging tends to increase. Therefore, as described above, when the duration of external charging in the midnight time period is extended as compared to the duration of external charging in the time period other than the midnight time period, it is possible to suppress an increase in cost of electricity required to carry out external charging.

On the other hand, when the time at which the charging completion time Te is set is earlier than the midnight rate initial time TMs, it is possible to carry out external charging not only in the midnight time period but also in the time period other than the midnight time period. In this case as well, as described above, when the duration of external charging in the midnight time period is extended as compared to the duration of external charging in the time period other than the midnight time period, it is possible to suppress an increase in cost of electricity required to carry out external charging.

In order to actively utilize electric power from the commercial power supply 28 in the midnight time period, the percentage of the duration of external charging in the midnight time period (referred to as first charging percentage) just needs to be increased as compared to the percentage of the duration of external charging in the time period other than the midnight time period (referred to as second charging percentage). The first charging percentage is a value obtained by dividing the duration of external charging in the midnight time period by the total time of the midnight time period. The second charging percentage is a value obtained by dividing the duration of external charging in the time period other than the midnight time period by the total time of the time period other than the midnight time period. Specifically, external charging just needs to be carried out such that the above-described condition of the percentages (the first charging percentage and the second charging percentage) in consideration of a time period from the time at which the charging completion time Te has been set to the charging completion time Te.

Figure 11:
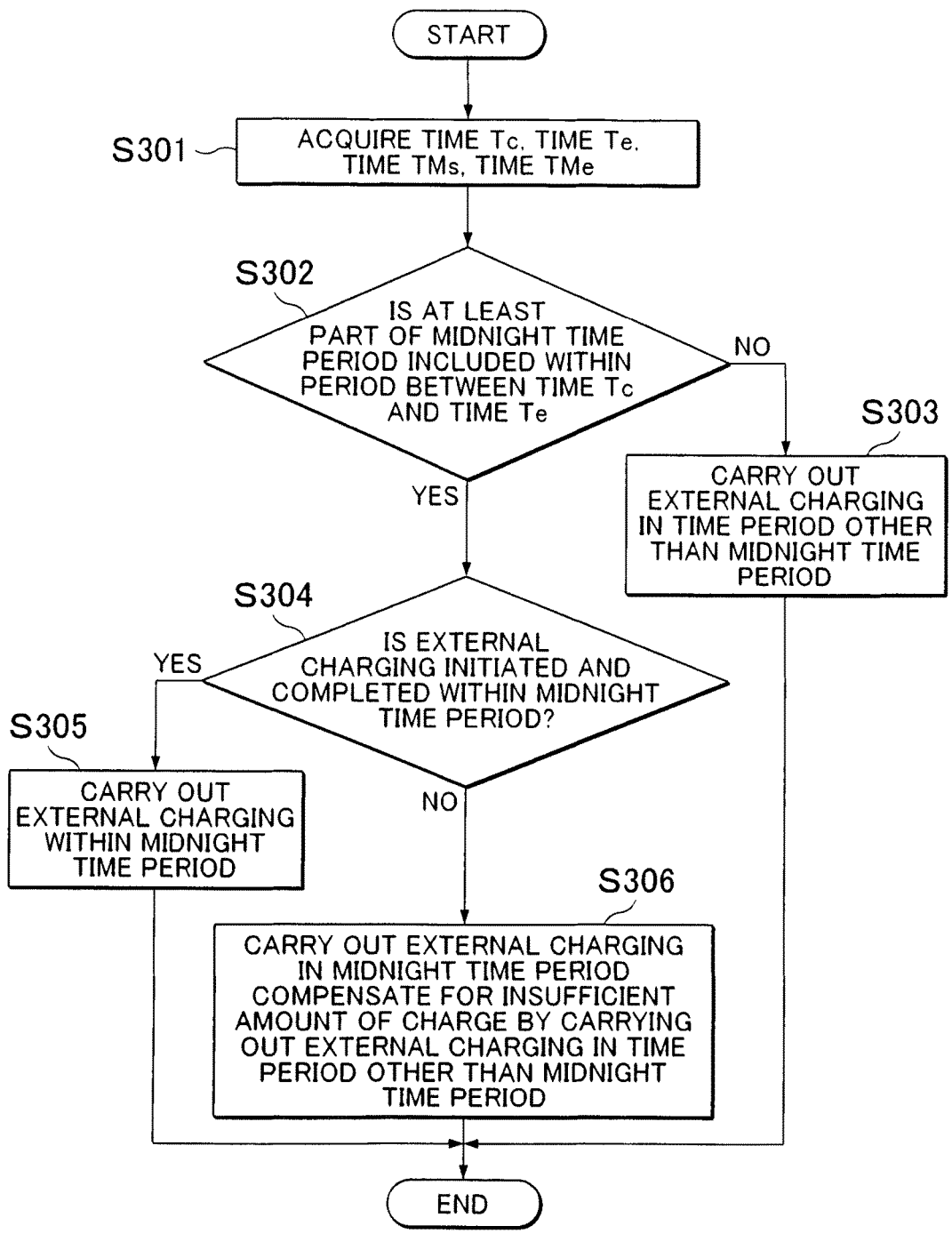
FIG. 11 is a flowchart that illustrates a time during which external charging is carried out.

The controller 30 is able to carry out external charging on the basis of the process shown in FIG. 11. The process shown in FIG. 11 is to specify the duration of external charging at the time of carrying out external charging on the basis of the process shown in FIG. 4. The process shown in FIG. 11 is initiated at the time when the charging completion time Te has been set.

In step S301 shown in FIG. 11, the controller 30 acquires the current time Tc, the charging completion time Te, the midnight rate initial time TMs and the midnight rate termination time TMe. Here, the current time Tc is the time at which the charging completion time Te has been set. In step S302, the controller 30 determines whether (at least part of) the midnight time period is included within the period from the current time Tc to the charging completion time Te.

The case where the midnight time period is included within the period from the current time Tc to the charging completion time Te includes four cases (FIG. 12A to FIG. 12D) as shown in FIG. 12A to FIG. 12D. In the case shown in FIG. 12A, the midnight time period is included within the period from the current time Tc to the charging completion time Te, and the midnight time period is longer than or equal to a time from the current time Tc to the charging completion time Te. In the case shown in FIG. 12B, the entire midnight time period is included within the period from the current time Tc to the charging completion time Te. The midnight rate initial time TMs is later than the current time Tc, and the midnight rate termination time TMe is earlier than the charging completion time Te.

Figure 12A:
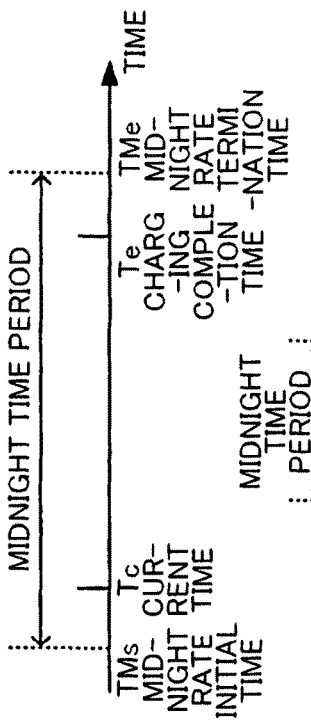
FIG. 12A to FIG. 12D are time charts each showing the correlation among a midnight time period, current time and charging completion time.
Figure 12B:
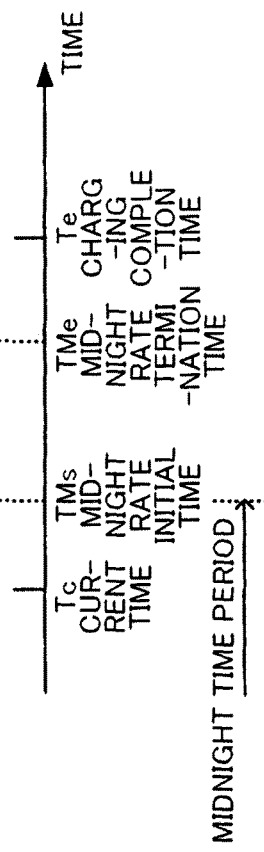
Figure 12C:
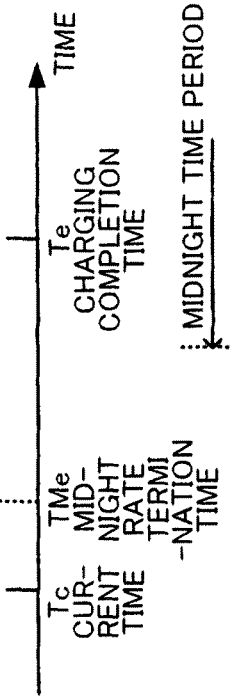
Figure 12D:
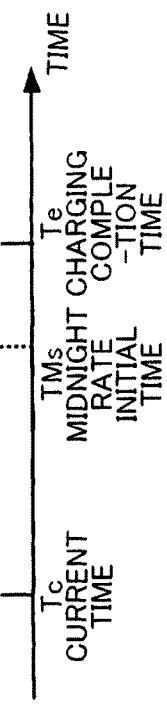

In the case shown in FIG. 12C, part of the midnight time period is included within the period from the current time Tc to the charging completion time Te, and the midnight rate termination time TMe is included in the period between the current time Tc and the charging completion time Te. In the case shown in FIG. 12D, part of the midnight time period is included within the period from the current time Tc to the charging completion time Te, and the midnight rate initial time TMs is included in the period between the current time Tc and the charging completion time Te.

When no midnight time period is included (even at least part of the midnight time period is not included) within the period from the current time Tc to the charging completion time Te, the controller 30 carries out external charging by, using the time period other than the midnight time period in step S303. When (at least part of) the midnight time period is included in the period from the current time Tc to the charging completion time Te, the controller 30 determines in step S304 whether it is possible to initiate and complete external charging within the midnight time period.

In the process of step S304, by acquiring the processing time ΔTp, the charging completion time Te, the midnight rate initial time TMs and the midnight rate termination time TMe, it is possible to determine whether it is possible to initiate and complete external charging within the midnight time period. In the case shown in FIG. 12A, it is possible to initiate and complete external charging within the midnight time period. In the case shown in FIG. 12B, when the processing time ΔTp is included within the midnight time period, it is possible to initiate and complete external charging within the midnight time period.

In the case shown in FIG. 12C, when the processing time ΔTp is included within the period between the current time Tc and the midnight rate termination time TMe, it is possible to initiate and complete external charging within the midnight time period. In the case shown in FIG. 12D, when the processing time ΔTp is included within the period between the midnight rate initial time TMs and the charging completion time Te, it is possible to initiate and complete external charging within the midnight time period. When it is possible to initiate and complete external charging within the midnight time period, the controller 30 carries out external charging within the midnight time period in step S305.

When it is not possible to initiate and complete external charging within the midnight time period, the controller 30 carries out external charging in the midnight time period in step S306. It is not possible to cause the SOC of the battery pack 10 to reach the target value SOC_targ only by carrying out external charging in the midnight time period, and an insufficient amount of charge remains. Therefore, in order to compensate for the insufficient amount of charge, external charging is also carried out in the time period other than the midnight time period.

When the process of step S306 is executed in the case shown in FIG. 12B, external charging is carried out by using the entire midnight time period, and external charging is carried out by also using the time period other than the midnight time period. When external charging is carried out in the time period other than the midnight time period, external charging may be carried out earlier than the midnight rate initial time TMs or external charging may be carried out later than the midnight rate termination time TMe. That is, external charging just needs to be completed by the charging completion time Te.

In the case shown in FIG. 12C, external charging is carried out in the midnight time period from the current time Tc to the midnight rate termination time TMe, and external charging is also carried out later than the midnight rate termination time TMe. In the case shown in FIG. 12D, external charging is carried out in the midnight time period from the midnight rate initial time TMs to the charging completion time Te, and external charging is also carried out earlier than the midnight rate initial time TMs.

External charging is carried out by sufficiently utilizing the midnight time period, and external charging is also carried out in the time period other than the midnight time period in order to compensate for an insufficient amount of charge. Thus, as described above, it is possible to cause the first charging percentage to be higher than the second charging percentage. Thus, a cost of electricity required to carry out external charging is easy to be reduced.

In the present embodiment, the user sets the charging completion time Te and the operation-starting time TU; however, setting of the charging completion time Te and the operation-starting time TU is not limited to this configuration. That is, the user is allowed to set only the operation-starting time TU without setting the charging completion time Te. In this case, external charging just needs to be completed by the operation-starting time TU, and the time at which external charging is completed may be set as needed. That is, the time at which external charging is completed is earlier than or equal to the operation-starting time TU. It is possible to carry out external charging on the basis of the thus set external charging completion time as in the case of the present embodiment.

On the other hand, the operation-starting time TU is set by the user. When the operation-starting time TU is later than the midnight rate termination time TMe, it is possible to execute the temperature adjustment process (the heating process or the cooling process) for the battery pack 10 by operating the temperature adjustment device 41 until the midnight rate termination time TMe as shown in FIG. 9 and FIG. 10. Thus, it is possible to operate the temperature adjustment device 41 by using only electric power from the commercial power supply 28 in the midnight time period, so it is possible to reduce a cost of electricity required to operate the temperature adjustment device 41.

However, the temperature adjustment process may be completed later than the midnight rate termination time TMe. Specifically, it is possible to complete the temperature adjustment process at any time in the period between the midnight rate termination time TMe and the operation-starting time TU. In this case, the temperature adjustment process is executed in the midnight time period and in the time period other than the midnight time period. When the duration of executing the temperature adjustment process in the midnight time period is longer than the duration of executing the temperature adjustment process in the time period other than the midnight time period, it is possible to execute the temperature adjustment process by actively using electric power from the commercial power supply 28 in the midnight time period. Thus, it becomes easy to reduce a cost of electricity required to operate the temperature adjustment device 41.

When the temperature adjustment process is executed at the midnight rate termination time TMe or later, as a time from the midnight rate termination time TMe to completion of the temperature adjustment process extends, the duration of executing the temperature adjustment process extends in the time period other than the midnight time period. In this case, a cost of electricity required to operate the temperature adjustment device 41 tends to increase. Therefore, as described above, when the duration of executing the temperature adjustment process in the midnight time period is extended as compared to the duration of executing the temperature adjustment process in the time period other than the midnight time period, it is possible to suppress an increase in cost of electricity required to operate the temperature adjustment device 41.

On the other hand, the temperature adjustment process may be executed earlier than the midnight rate initial time TMs, in other words, in the time period other than the midnight time period. In this case as well, as described above, when the duration of executing the temperature adjustment process in the midnight time period is extended as compared to the duration of executing the temperature adjustment process in the time period other than the midnight time period, it is possible to suppress an increase in cost of electricity required to execute the temperature adjustment process.

In order to actively utilize electric power from the commercial power supply 28 in the midnight time period, the percentage of the duration of executing the temperature adjustment process in the midnight time period just needs to be increased as compared to the percentage of the duration of executing the temperature adjustment process in the time period other than the midnight time period. Hereinafter, the percentage of the duration of executing the temperature adjustment process in the midnight time period is referred to as first adjustment percentage. The percentage of the duration of executing the temperature adjustment process in the time period other than the midnight time period is referred to as second adjustment percentage. The first adjustment percentage is a value obtained by dividing the duration of executing the temperature adjustment process in the midnight time period by the total time of the midnight time period. The second adjustment percentage is a value obtained by dividing the duration of executing the temperature adjustment process in the time period other than the midnight time period by the total time in the time period other than the midnight time period. Specifically, the temperature adjustment process just needs to be executed such that the condition of the above-described percentages (the first adjustment percentage and the second adjustment percentage) in consideration of a time period from the time at which the operation-starting time TU has been set to the operation-starting time TU.

Figure 13:
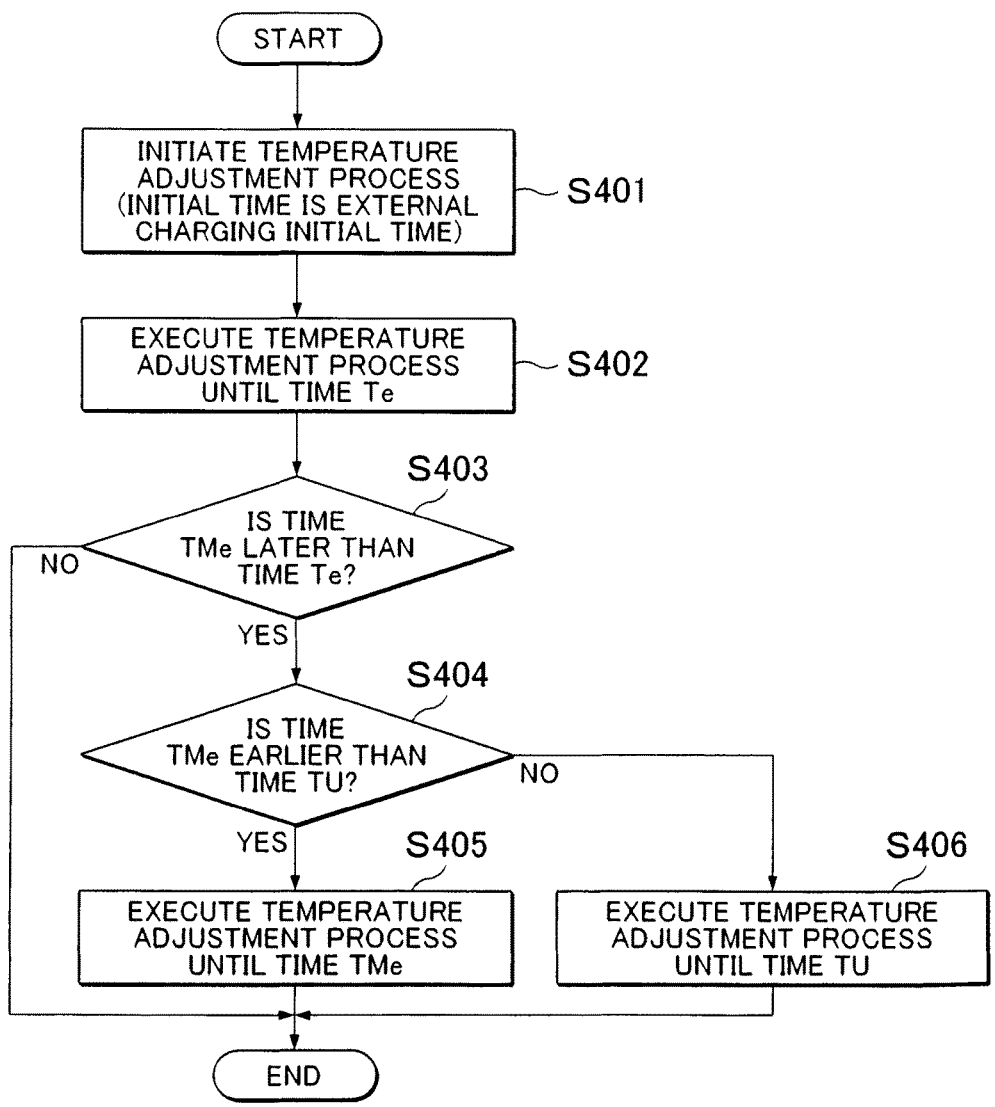
FIG. 13 is a flowchart that illustrates a time during which the temperature adjustment process is executed.

The controller 30 is able to execute the temperature adjustment process on the basis of the process shown in FIG. 13.

In step S401 shown in FIG. 13, the controller 30 initiates the temperature adjustment process at the time of initiating external charging. When it is possible to supply electric power, supplied from the commercial power supply 28, to the temperature adjustment device 41, it is possible to initiate the temperature adjustment process before external charging is initiated.

In step S402, the controller 30 executes the temperature adjustment process until the charging completion time Te. As described in the present embodiment, it is possible to execute the temperature adjustment process while carrying out external charging. On the other hand, it is possible to carry out external charging and execute the temperature adjustment process alternately. The temperature adjustment process is not executed when external charging is being carried out, and external charging is not carried out when the temperature adjustment process is being executed.

In step S403, the controller 30 determines whether the midnight rate termination time TMe is later than the charging completion time Te. When the midnight rate termination time TMe is earlier than or equal to the charging completion time Te, the controller 30 completes the process shown in FIG. 13. In this case, it is possible to execute the temperature adjustment process until the charging completion time Te.

When the midnight rate termination time TMe is later than the charging completion time Te, the controller 30 determines in step S404 whether the midnight rate termination time TMe is earlier than the operation-starting time TU. When the midnight rate termination time TMe is earlier than the operation-starting time TU, the controller 30 executes the temperature adjustment process until the midnight rate termination time TMe in step S405. That is, the temperature adjustment process is executed until the midnight rate termination time TMe even after passage of the charging completion time Te. When the midnight rate termination time TMe is later than or equal to the operation-starting time TU, the controller 30 executes the temperature adjustment process until the operation-starting time TU in step S406. That is, the temperature adjustment process is executed until the operation-starting time TU even after passage of the charging completion time Te.

When the temperature adjustment process is executed until the operation-starting time TU, the target temperature Ktarg is set. Thus, it is possible to bring the battery temperature Kb at the operation-starting time TU to the target temperature Ktarg by executing the temperature adjustment process. When the battery temperature Kb has reached the target temperature Ktarg earlier than the operation-starting time TU through the temperature adjustment process and then the battery temperature Kb is kept at the target temperature Ktarg, it is not required to execute the temperature adjustment process. Therefore, the temperature adjustment process may complete earlier than the operation-starting time TU, and the temperature adjustment process may not be executed thereafter. On the other hand, when the temperature adjustment process is not executed until the operation-starting time TU, the corrected temperature Kcorr is set. Thus, even when it is not possible to execute the temperature adjustment process until the operation-starting time TU, it is possible to bring the battery temperature Kb at the operation-starting time TU to the target temperature Ktarg.

With the process shown in FIG. 13, it is possible to execute the temperature adjustment process while external charging is being carried out. With the process shown in FIG. 11, when external charging is carried out by utilizing the midnight time period, it is possible to actively utilize electric power from the commercial power supply 28 in the midnight time period. Therefore, even when the temperature adjustment process is executed together with external charging, it is possible to actively utilize electric power from the commercial power supply 28 in the midnight time period, so it is possible to reduce a cost of electricity required to execute the temperature adjustment process.

In the present embodiment, the cost of electricity is varied between the midnight time period and the time period other than the midnight time period; however, the cost of electricity is not limited to this configuration. Specifically, the invention is applicable to the case where mutually different costs of electricity are set for three or more time periods. In this case, it is possible to carry out external charging or execute the temperature adjustment process as described above by separating into a time period during which a cost of electricity is the lowest (referred to as lowest rate time period) and a time period other than the lowest rate time period. The lowest rate time period corresponds to the midnight time period described in the present embodiment, and the time period other than the lowest rate time period corresponds to the time period other than the midnight time period, described in the present embodiment.

The invention is also applicable to the case where there are a plurality of lowest rate time periods in a day. The fact that there are a plurality of lowest rate time periods means that there is a time period other than the lowest rate time period, between the two lowest rate time periods. In this case as well, it is possible to carry out external charging on the basis of the process shown in FIG. 11.

Specifically, in the process of step S302 shown in FIG. 11, it is just required to be determined whether there is at least one lowest rate time period between the current time Tc and the charging completion time Te. In the process of step S304, it is just required to be determined whether it is possible to initiate and complete external charging within the at least one lowest rate time period present between the current time Tc and the charging completion time Te. With the process shown in FIG. 11, it is possible to carry out external charging by actively utilizing the at least one lowest rate time period. Thus, it is possible to reduce a cost of electricity required to carry out external charging.

On the other hand, when there is a plurality of lowest rate time periods in a day, it is possible to execute the temperature adjustment process on the basis of the process shown in FIG. 13. The midnight rate termination time TMe that is used in the processes of step S403 and step S404 shown in FIG. 13 becomes the termination time of the temporally closest lowest rate time period with respect to the charging completion time Te or the operation-starting time TU. As described above, when external charging is carried out by actively utilizing the at least one lowest rate time period, it is possible to actively utilize the at least one lowest rate time period even when the temperature adjustment process is executed. Thus, it is possible to reduce a cost of electricity required to execute the temperature adjustment process. As described in the process shown in FIG. 13, it is possible to bring the battery temperature Kb at the operation-starting time TU to, the target temperature Ktarg.

Figures 14A, 14B:
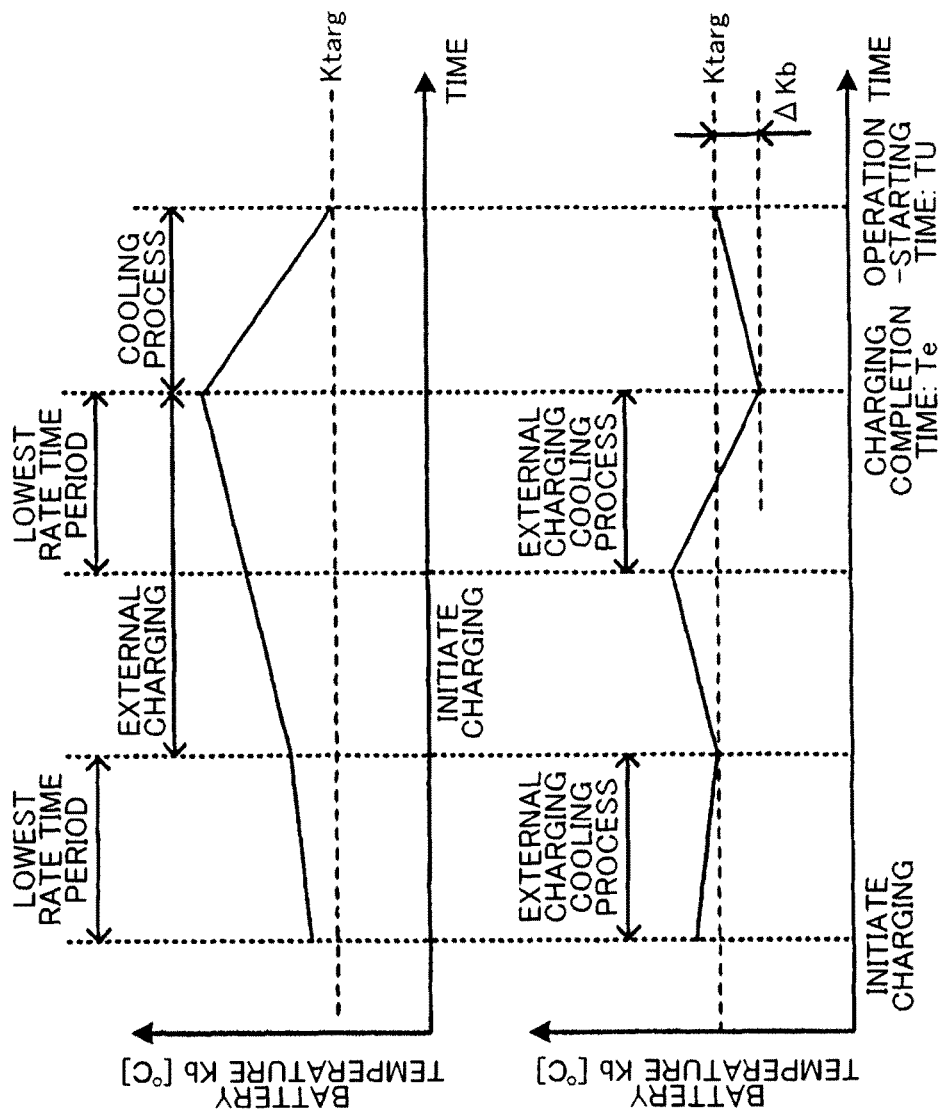
FIG. 14A and FIG. 14B are graphs each showing a time period during which external charging is carried out and the cooling process is executed, and a change in battery temperature.

In the example shown in FIG. 14A and FIG. 14B, there are two lowest rate time periods by the operation-starting time TU. As shown in FIG. 14A, if external charging is continued and is completed at the charging completion time Te, not only the lowest rate time period but also the time period other than the lowest time period is included within the period during which external charging is carried out. On the other hand, according to the present embodiment, as shown in FIG. 14B, it is possible to complete external charging at the charging completion time Te by actively utilizing the lowest rate time periods. Therefore, when external charging is carried out as shown in FIG. 14B, it is possible to reduce a cost of electricity required to carry out external charging as compared to when external charging is carried out as shown in FIG. 14A.

As shown in FIG. 14A, in order to bring the battery temperature Kb at the operation-starting time TU to the target temperature Ktarg, when the cooling process is executed until the operation-starting time TU, the cooling process is executed in the time period other than the lowest rate time period. On the other hand, according to the present embodiment, as shown in FIG. 14B, it is possible to bring the battery temperature Kb at the operation-starting time TU to the target temperature Kb by executing the cooling process by actively utilizing the lowest rate time periods. Therefore, when the cooling process is executed as shown in FIG. 14B, it is possible to reduce a cost of electricity required to execute the cooling process as compared to when the cooling process is executed as shown in FIG. 14A. FIG. 14A and FIG. 14B show the cases where the cooling process is executed. Even when the heating process is executed, it is possible to reduce a cost of electricity required to carry out external charging or execute the heating process according to the present embodiment.

What is claimed is:

1. An electrical storage system comprising:
   an electrical storage device mounted on a vehicle and configured to be charged with electric power supplied from a commercial power supply, the commercial power supply being set such that a cost of electricity of a first time period is lower than a cost of electricity of a second time period;
   a temperature adjustment device configured to adjust a temperature of the electrical storage device upon reception of electric power supplied from the commercial power supply; and
   a controller configured to control charging of the electrical storage device and operation of the temperature adjustment device,
   the controller being configured to complete charging of the electrical storage device by operation-starting time, which is scheduled time at which a start-up of the vehicle is initiated, while increasing a percentage of a charging time of the electrical storage device in the first time period as compared to a percentage of the charging time in the second time period when the first time period and the second time period are included within a period from when a user sets the operation-starting time to the operation-starting time, and
   the controller being configured to operate the temperature adjustment device such that a temperature of the electrical storage device at the operation-starting time falls within a target temperature range while increasing a percentage of an operating time of the temperature adjustment device in the first time period as compared to a percentage of the operating time in the second time period when the first time period and the second time period are included within the period from when the operation-starting time is set to the operation-starting time, wherein the controller is configured to estimate a temperature variation in the electrical storage device in a period from when the operation of the temperature adjustment device is completed to the operation-starting time on the basis of a temperature of a surrounding environment of the electrical storage device when the controller completes the operation of the temperature adjustment device earlier than the operation-starting time, and the controller is configured to increase the temperature of the electrical storage device at the time of completing the operation of the temperature adjustment device as compared to an upper limit value of the target temperature range by the temperature variation by heating the electrical storage device with the temperature adjustment device when the temperature variation is a variation of a decrease in the temperature of the electrical storage device.

2. The electrical storage system according to claim 1, wherein the controller is configured to increase the temperature of the electrical storage device at the time of completing the operation of the temperature adjustment device within a limit of an upper limit temperature that is allowed by the electrical storage device.

3. The electrical storage system according to claim 1, wherein the controller is configured to operate the temperature adjustment device while charging the electrical storage device with electric power from the commercial power supply.

4. The electrical storage system according to claim 1, wherein the controller is configured to operate the temperature adjustment device until the first time period termination time, when conditions i) and ii) are both satisfied:
i) a condition that a first time period termination time is later than a charging completion time; and
ii) a condition that the first time period termination time is earlier than the operation-starting time.

5. The electrical storage system according to claim 1, wherein the controller is configured to operate the temperature adjustment device until the operation-starting time, when conditions i) and ii) are both satisfied:
i) a condition that a first time period termination time is later than a charging completion time; and
ii) a condition that the first time period termination time is later than the operation-starting time.

6. An electrical storage system comprising:
an electrical storage device mounted on a vehicle and configured to be charged with electric power supplied from a commercial power supply, the commercial power supply being set such that a cost of electricity of a first time period is lower than a cost of electricity of a second time period;
a temperature adjustment device configured to adjust a temperature of the electrical storage device upon reception of electric power supplied from the commercial power supply; and
a controller configured to control charging of the electrical storage device and operation of the temperature adjustment device, the controller being configured to complete charging of the electrical storage device by operation-starting time, which is scheduled time at which a start-up of the vehicle is initiated, while increasing a percentage of a charging time of the electrical storage device in the first time period as compared to a percentage of the charging time in the second time period when the first time period and the second time period are included within a period from when a user sets the operation-starting time to the operation-starting time, and the controller being configured to operate the temperature adjustment device such that a temperature of the electrical storage device at the operation-starting time falls within a target temperature range while increasing a percentage of an operating time of the temperature adjustment device in the first time period as compared to a percentage of the operating time in the second time period when the first time period and the second time period are included within the period from when the operation-starting time is set to the operation-starting time, wherein the controller is configured to estimate a temperature variation in the electrical storage device in a period from when the operation of the temperature adjustment device is completed to the operation-starting time on the basis of a temperature of a surrounding environment of the electrical storage device when the controller completes the operation of the temperature adjustment device earlier than the operation-starting time, and the controller is configured to reduce the temperature of the electrical storage device at the time of completing the operation of the temperature adjustment device as compared to a lower limit value of the target temperature range by the temperature variation by cooling the electrical storage device with the temperature adjustment device when the temperature variation is a variation of an increase in the temperature of the electrical storage device.

* * * * *